(12) United States Patent
Wu et al.

(10) Patent No.: US 11,108,524 B2
(45) Date of Patent: Aug. 31, 2021

(54) METHOD AND DEVICE IN UE AND BASE STATION USED FOR WIRELESS COMMUNICATION

(71) Applicants: Lu Wu, Shanghai (CN); XiaoBo Zhang, Shanghai (CN); Lin Yang, Shanghai (CN)

(72) Inventors: Lu Wu, Shanghai (CN); XiaoBo Zhang, Shanghai (CN); Lin Yang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 131 days.

(21) Appl. No.: 16/656,544

(22) Filed: Oct. 17, 2019

(65) Prior Publication Data

US 2020/0127788 A1 Apr. 23, 2020

(30) Foreign Application Priority Data

Oct. 19, 2018 (CN) .......................... 201811221579.9

(51) Int. Cl.
*H04L 5/00* (2006.01)
*H04W 72/04* (2009.01)

(52) U.S. Cl.
CPC .......... *H04L 5/0053* (2013.01); *H04L 5/005* (2013.01); *H04W 72/044* (2013.01); *H04W 72/0413* (2013.01)

(58) Field of Classification Search
CPC ... H04L 5/0094; H04L 5/0053; H04L 5/0055; H04L 5/0005; H04L 5/0048; H04L 5/0098; H04L 1/00; H04L 5/0051; H04L 5/0044; H04L 5/0037; H04L 5/005; H04L 5/0057; H04W 72/042; H04W 72/0413;
(Continued)

(56) References Cited

U.S. PATENT DOCUMENTS 10,980,049 B2 * 4/2021 Yang ..................... H04L 5/0055
2018/0262311 A1 * 9/2018 Wang ................ H04W 72/1242
(Continued)

OTHER PUBLICATIONS

Yang et al. U.S. Appl. No. 62/669,941, filed May 10, 2018 (Year: 2018).*
Park et al. KR10-2018-0004091 filed Jan. 11, 2018 (Year: 2018).*

*Primary Examiner* — Wutchung Chu

(57) ABSTRACT

The present disclosure discloses a method and a device in a User Equipment (UE) and a base station used for wireless communication. The UE receives a first signaling, the first signaling being used for indicating a first time-frequency resource group, the first time-frequency resource group being reserved for a first bit block; and receives a second signaling, the second signaling being used for indicating a second time-frequency resource group, the second time-frequency resource group being reserved for a second bit block. Whether the first time-frequency resource group and the second time-frequency resource group belong to a same resource subset of G resource subsets is used for determining whether the first bit block and the second bit block are respectively transmitted in the first time-frequency resource group and the second time-frequency resource group or are both transmitted in a third time-frequency resource group.

16 Claims, 15 Drawing Sheets

(58) Field of Classification Search
CPC ............... H04W 72/044; H04W 72/12; H04W 72/1273; H04W 72/04; H04W 74/0833; H04W 72/1289; H04W 72/121; H04W 74/08; H04W 52/0229; H04W 74/002; H04W 72/0446; H04W 72/02; H04W 72/1268; H04W 74/006; H04W 72/0406; H04W 72/1263; H04J 11/0026; H04B 7/0626; H04B 7/088
See application file for complete search history.

(56) References Cited

U.S. PATENT DOCUMENTS

| | | | |
|---|---|---|---|
| 2018/0279291 A1* | 9/2018 | Tiirola | H04B 1/713 |
| 2018/0368137 A1* | 12/2018 | Yin | H04L 5/0055 |
| 2019/0052417 A1* | 2/2019 | Wang | H04W 72/0446 |
| 2019/0215095 A1* | 7/2019 | Park | H04W 72/042 |
| 2019/0297618 A1* | 9/2019 | Yang | H04L 5/0053 |
| 2019/0327751 A1* | 10/2019 | Dong | H04W 72/042 |
| 2019/0349923 A1* | 11/2019 | Shao | H04L 1/1887 |
| 2019/0349973 A1* | 11/2019 | Yang | H04L 5/0055 |
| 2020/0022161 A1* | 1/2020 | Yang | H04W 72/1242 |
| 2020/0044776 A1* | 2/2020 | Guan | H04L 1/0069 |
| 2020/0059327 A1* | 2/2020 | Kini | H04W 72/042 |
| 2020/0068599 A1* | 2/2020 | Yang | H04L 5/0055 |
| 2020/0214020 A1* | 7/2020 | Hong | H04L 1/0013 |
| 2020/0344032 A1* | 10/2020 | Yang | H04L 5/0094 |
| 2021/0058919 A1* | 2/2021 | Takeda | H04W 72/12 |

* cited by examiner

METHOD AND DEVICE IN UE AND BASE STATION USED FOR WIRELESS COMMUNICATION

CROSS-REFERENCE TO RELATED APPLICATION

This application claims the priority benefit of Chinese Patent Application Serial Number 201811221579.9, filed on Oct. 19, 2018, the full disclosure of which is incorporated herein by reference.

BACKGROUND

Technical Field

The present disclosure relates to transmission methods and devices in wireless communication systems, and in particular to a communication method and device that support data transmission on Unlicensed Spectrum.

Related Art

In 5G system, Enhance Mobile Broadband (eMBB) and Ultra Reliable and Low Latency Communication (URLLC) are two typical business types. In 3rd Generation Partner Project (3GPP) New Radio (NR) Release 15, a new Modulation and Coding Scheme (MCS) table targeting lower target Block Error Rate (BLER) required for URLLC business was defined.

With a purpose of supporting more demanding URLLC business, for example, with higher reliability (e.g., a target BLER is 10^-6) or with lower latency (e.g., 0.5-1 ms), a Study Item (SI) on URLLC advancement in NR Release 16 was approved at the 3GPP Radio Access Network (RAN) #80th Plenary Session. In the SI, the advancement in Uplink Control Information (UCI) feedback has been a focus of the study.

SUMMARY

The inventors have found through researches that UCI includes Hybrid Automatic Repeat reQuest (HARQ)/Channel State Information (CSI). In order to support transmission with more reliability and less latency in NR Release 16, how to transmit UCI in a Physical Uplink Control CHannel (PUCCH) becomes a significant problem needed to be reconsidered.

In view of the above problem, the present disclosure provides a solution. It should be noted that the embodiments of the present disclosure and the characteristics in the embodiments can be arbitrarily combined if there is no conflict.

The present disclosure discloses a method in a User Equipment (UE) for wireless communication, comprising:

receiving a first signaling, the first signaling being used for indicating a first time-frequency resource group, the first time-frequency resource group being reserved for a first bit block;

receiving a second signaling, the second signaling being used for indicating a second time-frequency resource group, the second time-frequency resource group being reserved for a second bit block; and transmitting the first bit block in the first time-frequency resource group and transmitting the second bit block in the second time-frequency resource group, or, transmitting the first bit block and the second bit block in a third time-frequency resource group;

herein, the first time-frequency resource group, the second time-frequency resource group and the third time-frequency resource group are all time-frequency resource groups of G resource subsets, any of the G resource subsets comprises a positive integer number of time-frequency resource group(s), G is a positive integer greater than 1; when the first signaling and the second signaling both carry a first identifier, the first bit block and the second bit block are transmitted in the third time-frequency resource group; when at least one of the first signaling or the second signaling carries a second identifier, the second identifier being different from the first identifier, whether the first time-frequency resource group and the second time-frequency resource group belong to a same resource subset out of the G resource subsets is used for determining whether the first bit block and the second bit block are respectively transmitted in the first time-frequency resource group and the second time-frequency resource group or are both transmitted in the third time-frequency resource group.

In one embodiment, a problem needed to be solved in the present disclosure is how to achieve advancement in transmitting UCI in a PUCCH to meet the requirement of higher reliability and lower latency of NR Release 16.

In one embodiment, a problem needed to be solved in the present disclosure is as follows: in accordance with current standards in NR Release 15, only one PUCCH resource is supported in transmitting a HARQ within a slot; therefore, when two pieces of DCI respectively schedule two PDSCH transmissions and HARQ feedbacks corresponding to each piece of DCI are located in a same slot, and the two pieces of DCI also indicate that two PUCCH resources are reserved for HARQ feedbacks respectively, these two HARQs will be transmitted in a PUCCH resource indicated by a last piece of DCI. In NR Release 16, URLLC UCI needs to support lower transmission latency, when two pieces of DCI respectively schedule two PDSCH transmissions and HARQ feedbacks corresponding to each piece of DCI are located in a same slot, wherein one PDSCH is a URLLC PDSCH and the other is a URLLC/eMBB PDSCH, if a PUCCH resource corresponding to the URLLC PDSCH occupies earlier time domain resources in the slot, while a PUCCH resource corresponding to the URLLC/eMBB PDSCH occupies later time domain resources in the slot, then employing the existing standard method of placing both HARQs in the later PUCCH resource corresponding to URLLC/eMBB PDSCH for transmission will undoubtedly increase transmission latency of HARQ feedback corresponding to the URLLC PDSCH. Therefore, in order to support the requirement of NR Release 16 for lower latency, when two pieces of UCI send feedback within the same slot, of which at least one is URLLC UCI, how to determine a PUCCH resource for transmitting UCI is a crucial problem that needs reconsidering.

In one embodiment, the essence of the above method lies in that the first time-frequency resource group, the second time-frequency resource group and the third time-frequency resource group are all PUCCH resources, both the first bit block and the second bit block are UCI, the first identifier corresponds to eMBB, the second identifier corresponds to URLLC, both the first signaling and the second signaling are DCI, wherein the second signaling is a last of the two pieces of DCI; if the first bit block and the second bit block both corresponds to the eMBB PDSCH, then the present practice of standard will be employed, namely, the two pieces of UCI are transmitted in a PUCCH resource indicated by the last DCI; if at least one of the first bit block or the second bit block corresponds to the URLLC PDSCH, then whether the two PUCCH resources belong to a same resource group is used for determining whether the two pieces of UCI are respectively transmitted in the two PUCCH resources or are multiplexed in the same PUCCH resource to be transmitted. An advantage of the above method is that the requirement of lower latency for URLLC posed by NR Release 16 can be supported when it comes to the situation where both pieces of UCI are transmitted in the two PUCCH resources.

According to one aspect of the present disclosure, the above method is characterized in comprising:

receiving first information;
receiving a first radio signal; and
receiving a second radio signal;

herein, the first information is used for indicating the first identifier and the second identifier, the first bit block is used for indicating whether the first radio signal is correctly received, the second bit block is used for indicating whether the second radio signal is correctly received; when the first signaling carries the first identifier, the first signaling is used for indicating a modulation and coding scheme (MCS) employed by the first radio signal out of a first MCS set; when the first signaling carries the second identifier, the first signaling is used for indicating an MCS employed by the first radio signal out of a second MCS set; when the second signaling carries the first identifier, the second signaling is used for indicating an MCS employed by the second radio signal out of the first MCS set; when the second signaling carries the second identifier, the second signaling is used for indicating an MCS employed by the second radio signal out of the second MCS set; a target BLER of the first MCS set is greater than a target BLER of the second MCS set.

According to one aspect of the present disclosure, the above method is characterized in that at least one of the first signaling or the second signaling carries the second identifier; when the first time-frequency resource group and the second time-frequency resource group belong to two different resource subsets out of the G resource subsets respectively, the first bit block is transmitted in the first time-frequency resource group and the second bit block is transmitted in the second time-frequency resource group; when both the first time-frequency resource group and the second time-frequency resource group belong to a same resource subset of the G resource subsets, the first bit block and the second bit block are transmitted in the third time-frequency resource group.

In one embodiment, the essence of the above method lies in that UCI in two PUCCH resources of the same resource subset can be multiplexed in a same PUCCH resource to be transmitted; UCI in two PUCCH resources respectively belonging to different resource subsets are transmitted in reserved PUCCH resources respectively. An advantage of the above method is allocating different groups of PUCCH resources to ensure the requirement of lower transmission latency for URLLC UCI of NR Release 16.

According to one aspect of the present disclosure, the above method is characterized in that the G resource subsets all belong to a first time window in time domain, the first time window comprises G1 time sub-windows, any two of the G1 time sub-windows are orthogonal, G1 is a positive integer greater than 1 and no greater than the G; any of the G resource subsets belongs to only one of the G1 time sub-windows in time domain, any of the G1 time sub-windows comprises time domain resources occupied by at least one of the G resource subsets; at least one of the first signaling or the second signaling carries the second identifier, whether the first time-frequency resource group and the second time-frequency resource group belong to a same time sub-window out of the G1 time sub-windows is used for determining whether the first bit block and the second bit block are respectively transmitted in the first time-frequency resource group and the second time-frequency resource group or are both transmitted in the third time-frequency resource group.

According to one aspect of the present disclosure, the above method is characterized in that when the first time-frequency resource group and the second time-frequency resource group respectively belong to two different time sub-windows out of the G1 time sub-windows in time domain, the first bit block is transmitted in the first time-frequency resource group and the second bit block is transmitted in the second time-frequency resource group; when both the first time-frequency resource group and the second time-frequency resource group belong to a same time sub-window out of the G1 time sub-windows in time domain, the first bit block and the second bit block are transmitted in the third time-frequency resource group.

In one embodiment, the essence of the above method lies in that assuming that G1 is equal to 2, a slot is divided into two time windows, if both two PUCCH resources belong to an earlier time window of the slot or a later time window of the slot, then two pieces of UCI can be multiplexed in a same PUCCH resource for transmission; if the two PUCCH resources respectively belong to these two time windows, then the two pieces of UCI are transmitted respectively in the two PUCCH resources rather than being multiplexed in a same PUCCH resource for transmission. An advantage of the above method is that a piece of URLLC UCI to be transmitted in a PUCCH resource reserved in the earlier time window cannot be multiplexed in the later time window for transmission, thereby ensuring lower transmission latency of URLLC UCI of NR Release 16.

According to one aspect of the present disclosure, the above method is characterized in comprising:

receiving second information;

herein, the second information is used for indicating the G resource subsets.

According to one aspect of the present disclosure, the above method is characterized in comprising:

receiving third information;

herein, the third information is used for indicating N time-frequency resource group sets, any of the N time-frequency resource group sets comprises a positive integer number of time-frequency resource group(s), any of the G resource subsets is composed of a positive integer number of time-frequency resource group(s) out of the N time-frequency resource groups sets, N is a positive integer; the first time-frequency resource group is a time-frequency resource group out of a first time-frequency resource group set, the second time-frequency resource group is a time-frequency resource group out of a second time-frequency resource group set, the third time-frequency resource group is a time-frequency resource group out of a third time-frequency resource group set; the first time-frequency resource group set, the second time-frequency resource group set and the third time-frequency resource group set are all time-frequency resource group sets of the N time-frequency resource group sets.

According to one aspect of the present disclosure, the above method is characterized in that the N is greater than 1; a number of bits comprised in the first bit block is used for determining the first time-frequency resource group set out of the N time-frequency resource group sets; a number of bits comprised in the second bit block is used for determining the second time-frequency resource group set out of the N time-frequency resource group sets, or a sum of the number of bits comprised in the first bit block and the number of bits comprised in the second bit block is used for determining the second time-frequency resource group set out of the N time-frequency resource group sets.

According to one aspect of the present disclosure, the above method is characterized in that a sum of the number of bits comprised in the first bit block and the number of bits comprised in the second bit block is used for determining the third time-frequency resource group set out of the N time-frequency resource group sets.

The present disclosure discloses a method in a base station for wireless communication, comprising:

transmitting a first signaling, the first signaling being used for indicating a first time-frequency resource group, the first time-frequency resource group being reserved for a first bit block;

transmitting a second signaling, the second signaling being used for indicating a second time-frequency resource group, the second time-frequency resource group being reserved for a second bit block; and receiving the first bit block in the first time-frequency resource group and receiving the second bit block in the second time-frequency resource group, or, receiving the first bit block and the second bit block in a third time-frequency resource group;

herein, the first time-frequency resource group, the second time-frequency resource group and the third time-frequency resource group are all time-frequency resource groups of G resource subsets, any of the G resource subsets comprises a positive integer number of time-frequency resource group(s), G is a positive integer greater than 1; when the first signaling and the second signaling both carry a first identifier, the first bit block and the second bit block are received in the third time-frequency resource group; when at least one of the first signaling or the second signaling carries a second identifier, the second identifier being different from the first identifier, whether the first time-frequency resource group and the second time-frequency resource group belong to a same resource subset out of the G resource subsets is used for determining whether the first bit block and the second bit block are respectively received in the first time-frequency resource group and the second time-frequency resource group or are both received in the third time-frequency resource group.

According to one aspect of the present disclosure, the above method is characterized in comprising:

transmitting first information;
transmitting a first radio signal; and
transmitting a second radio signal;

herein, the first information is used for indicating the first identifier and the second identifier, the first bit block is used for indicating whether the first radio signal is correctly received, the second bit block is used for indicating whether the second radio signal is correctly received; when the first signaling carries the first identifier, the first signaling is used for indicating an MCS employed by the first radio signal out of a first MCS set; when the first signaling carries the second identifier, the first signaling is used for indicating an MCS employed by the first radio signal out of a second MCS set; when the second signaling carries the first identifier, the second signaling is used for indicating an MCS employed by the second radio signal out of the first MCS set; when the second signaling carries the second identifier, the second signaling is used for indicating an MCS employed by the second radio signal out of the second MCS set; a target BLER of the first MCS set is greater than a target BLER of the second MCS set.

According to one aspect of the present disclosure, the above method is characterized in that at least one of the first signaling or the second signaling carries the second identifier; when the first time-frequency resource group and the second time-frequency resource group belong to two different resource subsets out of the G resource subsets respectively, the first bit block is received in the first time-frequency resource group and the second bit block is received in the second time-frequency resource group; when both the first time-frequency resource group and the second time-frequency resource group belong to a same resource subset of the G resource subsets, the first bit block and the second bit block are received in the third time-frequency resource group.

According to one aspect of the present disclosure, the above method is characterized in that the G resource subsets all belong to a first time window in time domain, the first time window comprises G1 time sub-windows, any two of the G1 time sub-windows are orthogonal, G1 is a positive integer greater than 1 and no greater than the G; any of the G resource subsets belongs to only one of the G1 time sub-windows in time domain, any of the G1 time sub-windows comprises time domain resources occupied by at least one of the G resource subsets; at least one of the first signaling or the second signaling carries the second identifier, whether the first time-frequency resource group and the second time-frequency resource group belong to a same time sub-window out of the G1 time sub-windows is used for determining whether the first bit block and the second bit block are respectively received in the first time-frequency resource group and the second time-frequency resource group or are both received in the third time-frequency resource group.

According to one aspect of the present disclosure, the above method is characterized in that when the first time-frequency resource group and the second time-frequency resource group respectively belong to two different time sub-windows out of the G1 time sub-windows in time domain, the first bit block is received in the first time-frequency resource group and the second bit block is received in the second time-frequency resource group; when both the first time-frequency resource group and the second time-frequency resource group belong to a same time sub-window out of the G1 time sub-windows in time domain, the first bit block and the second bit block are received in the third time-frequency resource group.

According to one aspect of the present disclosure, the above method is characterized in comprising:

transmitting second information;

herein, the second information is used for indicating the G resource subsets.

According to one aspect of the present disclosure, the above method is characterized in comprising:

transmitting third information;

herein, the third information is used for indicating N time-frequency resource group sets, any of the N time-frequency resource group sets comprises a positive integer number of time-frequency resource group(s), any of the G resource subsets is composed of a positive integer number of time-frequency resource group(s) out of the N time-frequency resource groups sets, N is a positive integer; the first time-frequency resource group is a time-frequency resource group out of a first time-frequency resource group set, the second time-frequency resource group is a time-frequency resource group out of a second time-frequency resource group set, the third time-frequency resource group is a time-frequency resource group out of a third time-frequency resource group set; the first time-frequency resource group set, the second time-frequency resource group set and the third time-frequency resource group set are all time-frequency resource group sets of the N time-frequency resource group sets.

According to one aspect of the present disclosure, the above method is characterized in that the N is greater than 1; a number of bits comprised in the first bit block is used for determining the first time-frequency resource group set out of the N time-frequency resource group sets; a number of bits comprised in the second bit block is used for determining the second time-frequency resource group set out of the N time-frequency resource group sets, or a sum of the number of bits comprised in the first bit block and the number of bits comprised in the second bit block is used for determining the second time-frequency resource group set out of the N time-frequency resource group sets.

According to one aspect of the present disclosure, the above method is characterized in that a sum of the number of bits comprised in the first bit block and the number of bits comprised in the second bit block is used for determining the third time-frequency resource group set out of the N time-frequency resource group sets.

The present disclosure discloses a UE used for wireless communication, comprising:

a first receiver, receiving a first signaling, the first signaling being used for indicating a first time-frequency resource group, the first time-frequency resource group being reserved for a first bit block; and receiving a second signaling, the second signaling being used for indicating a second time-frequency resource group, the second time-frequency resource group being reserved for a second bit block; and a first transmitter, transmitting the first bit block in the first time-frequency resource group and transmitting the second bit block in the second time-frequency resource group, or, transmitting the first bit block and the second bit block in a third time-frequency resource group;

herein, the first time-frequency resource group, the second time-frequency resource group and the third time-frequency resource group are all time-frequency resource groups of G resource subsets, any of the G resource subsets comprises a positive integer number of time-frequency resource group(s), G is a positive integer greater than 1; when the first signaling and the second signaling both carry a first identifier, the first bit block and the second bit block are transmitted in the third time-frequency resource group; when at least one of the first signaling or the second signaling carries a second identifier, the second identifier being different from the first identifier, whether the first time-frequency resource group and the second time-frequency resource group belong to a same resource subset out of the G resource subsets is used for determining whether the first bit block and the second bit block are respectively transmitted in the first time-frequency resource group and the second time-frequency resource group or are both transmitted in the third time-frequency resource group.

The present disclosure discloses a base station used for wireless communication, comprising:

a second transmitter, transmitting a first signaling, the first signaling being used for indicating a first time-frequency resource group, the first time-frequency resource group being reserved for a first bit block; and transmitting a second signaling, the second signaling being used for indicating a second time-frequency resource group, the second time-frequency resource group being reserved for a second bit block;

a second receiver, receiving the first bit block in the first time-frequency resource group and receiving the second bit block in the second time-frequency resource group, or, receiving the first bit block and the second bit block in a third time-frequency resource group;

herein, the first time-frequency resource group, the second time-frequency resource group and the third time-frequency resource group are all time-frequency resource groups of G resource subsets, any of the G resource subsets comprises a positive integer number of time-frequency resource group(s), G is a positive integer greater than 1; when the first signaling and the second signaling both carry a first identifier, the first bit block and the second bit block are received in the third time-frequency resource group; when at least one of the first signaling or the second signaling carries a second identifier, the second identifier being different from the first identifier, whether the first time-frequency resource group and the second time-frequency resource group belong to a same resource subset out of the G resource subsets is used for determining whether the first bit block and the second bit block are respectively received in the first time-frequency resource group and the second time-frequency resource group or are both received in the third time-frequency resource group.

In one embodiment, the present disclosure has the following advantages over conventional schemes:

In the current standards in NR Release 15, only one PUCCH resource is supported in transmitting a HARQ within a slot; therefore, when two pieces of DCI respectively schedule two PDSCH transmissions and corresponding HARQ feedbacks are located in a same slot, and the two pieces of DCI also indicate that two PUCCH resources are reserved for HARQ feedbacks respectively, these two HARQs will be transmitted in a PUCCH resource indicated by a last piece of DCI. In NR Release 16, URLLC UCI needs to support lower transmission latency, when two pieces of DCI respectively schedule two PDSCH transmissions and HARQ feedbacks corresponding to each piece of DCI are located in a same slot, wherein one PDSCH is a URLLC PDSCH and the other is a URLLC/eMBB PDSCH, if a PUCCH resource corresponding to the URLLC PDSCH occupies earlier time domain resources in the slot, while a PUCCH resource corresponding to the URLLC/eMBB PDSCH occupies later time domain resources in the slot, then employing the existing standard method of placing both HARQs in the later PUCCH resource corresponding to the URLLC/eMBB PDSCH for transmission will undoubtedly increase transmission latency of HARQ feedback corresponding to the URLLC PDSCH. The method of determining the PUCCH resource for transmitting UCI put forward in the present disclosure can meet the requirement of NR Release 16 for lower latency of URLLC.

If feedback of two pieces of UCIs respectively corresponding to two PDSCH is required within the same slot, whether the two pieces of UCI are respectively transmitted in two reserved PUCCH resources or are multiplexed in a same PUCCH resource to be transmitted depends on whether these PDSCHs are eMBB or URLLC. If both PDSCHs are eMBB PDSCHs, then the present standard practice will be employed, i.e., placing two pieces of UCI in a PUCCH resource indicated by a last piece of DCI to be transmitted; if at least one of two PDSCHs is a URLLC PDSCH, then whether two PUCCH resources belong to a same resource subset is used for determining whether the two pieces of UCI are respectively transmitted in two reserved PUCCH resources or are multiplexed in a same PUCCH resource for transmission.

UCI in two PUCCH resources of the same resource subset can be multiplexed in a same PUCCH resource; UCI in two PUCCH resources respectively belonging to different resource subsets are respectively transmitted in reserved PUCCH resources. By allocating different groups of PUCCH resource to different PDSCHs, the requirement of lower transmission latency for URLLC UCI posed by NR Release 16 can be guaranteed.

Assuming that a slot is divided into two time windows, PUCCH resources of a same resource subset all belong to a same time window, while PUCCH resources of different resource subsets belong to different time windows. If two PUCCH resources both belong to an earlier time window of the slot or to a later time window, the two pieces of UCI can be multiplexed in a same PUCCH resource to be transmitted; if two PUCCH resources respectively belong to these two time windows, then the two pieces of UCI are respectively transmitted in the two PUCCH resources rather than being multiplexed in a same PUCCH resource for transmission. Therefore, a piece of URLLC UCI to be transmitted in a PUCCH resource reserved in the earlier time window cannot be multiplexed in the later time window for transmission, thereby ensuring lower transmission latency of URLLC UCI of NR Release 16.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
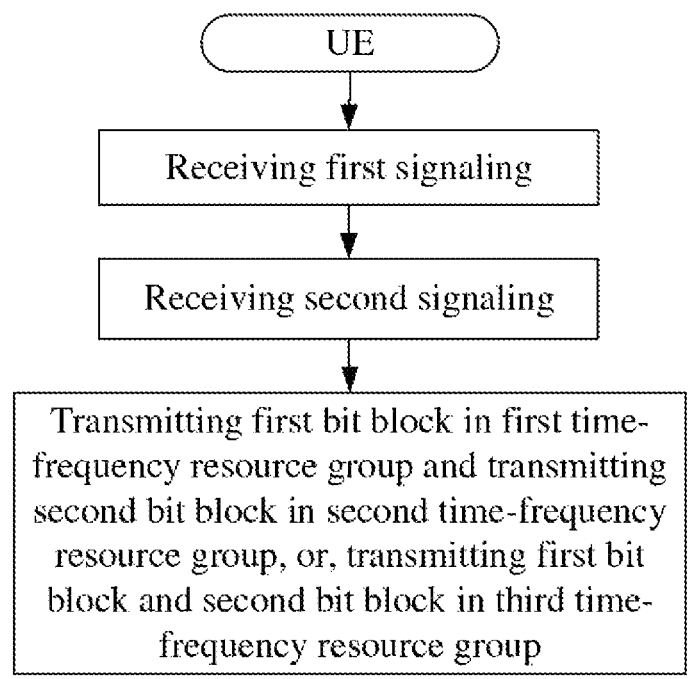
FIG. 1 illustrates a flowchart of a first signaling, a second signaling and a first bit block according to one embodiment of the present disclosure.

Embodiment 1 illustrates a flowchart of a first signaling, a second signaling, a first bit block and a second bit block, as shown in FIG. 1.

In Embodiment 1, the UE in the present disclosure receives a first signaling, the first signaling being used for indicating a first time-frequency resource group, the first time-frequency resource group being reserved for a first bit block; receives a second signaling, the second signaling being used for indicating a second time-frequency resource group, the second time-frequency resource group being reserved for a second bit block; transmits the first bit block in the first time-frequency resource group and transmits the second bit block in the second time-frequency resource group, or, transmits the first bit block and the second bit block in a third time-frequency resource group; herein, the first time-frequency resource group, the second time-frequency resource group and the third time-frequency resource group are all time-frequency resource groups of G resource subsets, any of the G resource subsets comprises a positive integer number of time-frequency resource group(s), G is a positive integer greater than 1; when the first signaling and the second signaling both carry a first identifier, the first bit block and the second bit block are transmitted in the third time-frequency resource group; when at least one of the first signaling or the second signaling carries a second identifier, the second identifier being different from the first identifier, whether the first time-frequency resource group and the second time-frequency resource group belong to a same resource subset out of the G resource subsets is used for determining whether the first bit block and the second bit block are respectively transmitted in the first time-frequency resource group and the second time-frequency resource group or are both transmitted in the third time-frequency resource group.

In one embodiment, the first signaling is dynamically configured.

In one embodiment, the first signaling is a physical layer signaling.

In one embodiment, the first signaling is a Downlink Control Information (DCI) signaling.

In one embodiment, the first signaling is a DCI signaling with DownLink Grant.

In one embodiment, the first signaling is transmitted on a downlink physical layer control channel (i.e., a downlink channel only capable of carrying a physical layer signaling).

In one subembodiment of the above embodiment, the downlink physical layer control channel is a Physical Downlink Control CHannel (PDCCH).

In one subembodiment of the above embodiment, the downlink physical layer control channel is a short PDCCH (sPDCCH).

In one subembodiment of the above embodiment, the downlink physical layer control channel is a New Radio PDCCH (NR-PDCCH).

In one subembodiment of the above embodiment, the downlink physical layer control channel is a Narrow Band PDCCH (NB-PDCCH).

In one embodiment, the first signaling is transmitted on a downlink physical layer data channel (i.e., a downlink channel capable of carrying physical layer data).

In one subembodiment of the above embodiment, the downlink physical layer data channel is a Physical Downlink Shared CHannel (PDSCH).

In one subembodiment of the above embodiment, the downlink physical layer data channel is a short PDSCH (sPDSCH).

In one subembodiment of the above embodiment, the downlink physical layer data channel is a New Radio PDSCH (NR-PDSCH).

In one subembodiment of the above embodiment, the downlink physical layer data channel is a Narrow Band PDSCH (NB-PDSCH).

In one embodiment, the first signaling is DCI format 1_0, the specific meaning of the DCI format 1_0 can be found in 3GPP TS38.212, chapter 7.3.1.2.

In one embodiment, the first signaling is DCI format 1_1, the specific meaning of the DCI format 1_1 can be found in 3GPP TS38.212, chapter 7.3.1.2.

In one embodiment, the first time-frequency resource group is reserved for transmission of a first bit block.

In one embodiment, the second time-frequency resource group is reserved for transmission of a second bit block.

In one embodiment, the first time-frequency resource group is time-frequency resources belonging to an uplink physical layer control channel (i.e., an uplink channel only capable of carrying a physical layer signaling).

In one subembodiment of the above embodiment, the uplink physical layer control channel is a Physical Uplink Control CHannel (PUCCH).

In one subembodiment of the above embodiment, the uplink physical layer control channel is a short PUCCH (sPUCCH).

In one subembodiment of the above embodiment, the uplink physical layer control channel is a New Radio PUCCH (NR-PUCCH).

In one subembodiment of the above embodiment, the uplink physical layer control channel is a Narrow Band PUCCH (NB-PUCCH).

In one embodiment, the second time-frequency resource group is time-frequency resources belonging to an uplink physical layer control channel (i.e., an uplink channel only capable of carrying a physical layer signaling).

In one subembodiment of the above embodiment, the uplink physical layer control channel is a PUCCH.

In one subembodiment of the above embodiment, the uplink physical layer control channel is an sPUCCH.

In one subembodiment of the above embodiment, the uplink physical layer control channel is an NR-PUCCH.

In one subembodiment of the above embodiment, the uplink physical layer control channel is an NB-PUCCH.

In one embodiment, the first time-frequency resource group comprises a positive integer number of Resource Elements (REs).

In one embodiment, the first time-frequency resource group comprises a positive integer number of multicarrier symbol(s) in time domain, and comprises a positive integer number of subcarrier(s) in frequency domain.

In one embodiment, the second time-frequency resource group comprises a positive integer number of REs.

In one embodiment, the second time-frequency resource group comprises a positive integer number of multicarrier symbol(s) in time domain, and comprises a positive integer number of subcarrier(s) in frequency domain.

In one embodiment, the multicarrier symbol is an Orthogonal Frequency Division Multiplexing (OFDM) symbol.

In one embodiment, the multicarrier symbol is a Single Carrier-Frequency Division Multiple Access (SC-FDMA) symbol.

In one embodiment, the multicarrier symbol is a Discrete Fourier Transform Spread OFDM (DFT-S-OFDM) symbol.

In one embodiment, the multicarrier symbol is a Filter Bank Multi Carrier (FBMC) symbol.

In one embodiment, the multicarrier symbol comprises a Cyclic Prefix (CP).

In one embodiment, the first bit block comprises a positive integer number of bits.

In one embodiment, the first bit block carries Hybrid Automatic Repeat reQuest ACKnowledgement (HARQ-ACK) feedback.

In one embodiment, part of bits in the first bit block carries HARQ-ACK feedback.

In one embodiment, all of bits in the first bit block carries HARQ-ACK feedback.

In one embodiment, the second signaling is dynamically configured.

In one embodiment, the second signaling is a physical layer signaling.

In one embodiment, the second signaling is a DCI signaling.

In one embodiment, the second signaling is a DCI signaling with Downlink Grant.

In one embodiment, the second signaling is transmitted on a downlink physical layer control channel (i.e., a downlink channel only capable of carrying a physical layer signaling).

In one subembodiment of the above embodiment, the downlink physical layer control channel is a PDCCH.

In one subembodiment of the above embodiment, the downlink physical layer control channel is an sPDCCH.

In one subembodiment of the above embodiment, the downlink physical layer control channel is an NR-PDCCH.

In one subembodiment of the above embodiment, the downlink physical layer control channel is an NB-PDCCH.

In one embodiment, the second signaling is transmitted on a downlink physical layer data channel (i.e., a downlink channel capable of carrying physical layer data).

In one subembodiment of the above embodiment, the downlink physical layer data channel is a PDSCH.

In one subembodiment of the above embodiment, the downlink physical layer data channel is an sPDSCH.

In one subembodiment of the above embodiment, the downlink physical layer data channel is an NR-PDSCH.

In one subembodiment of the above embodiment, the downlink physical layer data channel is an NB-PDSCH.

In one embodiment, the second signaling is DCI format 1_0, the specific meaning of the DCI format 1_0 can be found in 3GPP TS38.212, chapter 7.3.1.2.

In one embodiment, the second signaling is DCI format 1_1, the specific meaning of the DCI format 1_1 can be found in 3GPP TS38.212, chapter 7.3.1.2.

In one embodiment, a start time for transmission of the first signaling is no later than a start time for transmission of the second signaling.

In one embodiment, a start time for transmission of the first signaling is earlier than a start time for transmission of the second signaling.

In one embodiment, the first signaling and the second signaling are both transmitted in a second time window, the first signaling is transmitted in a first frequency sub-band, while the second signaling is transmitted in a second frequency sub-band, the first frequency sub-band being different from the second frequency sub-band.

In one subembodiment of the above embodiment, an index of the second frequency sub-band is less than an index of the first frequency sub-band.

In one subembodiment of the above embodiment, an index of the second frequency sub-band is greater than an index of the first frequency sub-band.

In one subembodiment of the above embodiment, the first frequency sub-band comprises a carrier, and the second frequency sub-band comprises a carrier.

In one subembodiment of the above embodiment, the first frequency sub-band comprises a BandWidth Part (BWP), and the second frequency sub-band comprises a BWP.

In one subembodiment of the above embodiment, the first frequency sub-band comprises a subband, and the second frequency sub-band comprises a subband.

In one subembodiment of the above embodiment, the second time window comprises a slot.

In one subembodiment of the above embodiment, the second time window comprises a subframe.

In one subembodiment of the above embodiment, the second time window comprises a positive integer number of consecutive multicarrier symbols.

In one subembodiment of the above embodiment, the second time window comprises a PDCCH monitoring occasion.

In one embodiment, the first signaling is transmitted in a third time window, the second signaling is transmitted in a fourth time window, the third time window being different from the fourth time window.

In one subembodiment of the above embodiment, the third time window comprises a slot.

In one subembodiment of the above embodiment, the third time window comprises a subframe.

In one subembodiment of the above embodiment, the third time window comprises a positive integer number of consecutive multicarrier symbols.

In one subembodiment of the above embodiment, the third time window comprises a PDCCH monitoring occasion.

In one subembodiment of the above embodiment, the fourth time window comprises a slot.

In one subembodiment of the above embodiment, the fourth time window comprises a subframe.

In one subembodiment of the above embodiment, the fourth time window comprises a positive integer number of consecutive multicarrier symbols.

In one subembodiment of the above embodiment, the fourth time window comprises a PDCCH monitoring occasion.

In one embodiment, the second bit block comprises a positive integer number of bits.

In one embodiment, the second bit block carries HARQ-ACK feedback.

In one embodiment, part of bits in the second bit block carries HARQ-ACK feedback.

In one embodiment, all of bits in the second bit block carries HARQ-ACK feedback.

In one embodiment, the second time-frequency resource group is used for determining the third time-frequency resource group.

In one embodiment, an index of the second time-frequency resource group is used for determining the third time-frequency resource group.

In one embodiment, an index of the second time-frequency resource group is used for determining an index of the third time-frequency resource group.

In one embodiment, the third time-frequency resource group is the same as the second time-frequency resource group.

In one embodiment, the third time-frequency resource group is different from the second time-frequency resource group.

In one embodiment, the second signaling is used for determining the third time-frequency resource group.

In one embodiment, the second signaling is used for indicating the third time-frequency resource group.

In one embodiment, the third time-frequency resource is indicated by a third signaling, the third signaling being different from the second signaling.

In one subembodiment of the above embodiment, the third signaling is dynamically configured.

In one subembodiment of the above embodiment, the third signaling is a physical layer signaling.

In one subembodiment of the above embodiment, the third signaling is a DCI signaling.

In one subembodiment of the above embodiment, the third signaling is transmitted on a downlink physical layer control channel.

In one subembodiment of the above embodiment, the third signaling is transmitted on a downlink physical layer data channel.

In one embodiment, the first identifier is a signaling identifier.

In one embodiment, the first identifier is a non-negative integer.

In one embodiment, the first identifier is a Radio Network Temporary Identifier (RNTI).

In one embodiment, the first identifier is a Cell-Radio Network Temporary Identifier (C-RNTI).

In one embodiment, the first identifier is a Configured Scheduling (CS)-RNTI

In one embodiment, the first signaling carries the first identifier.

In one subembodiment of the above embodiment, the first identifier is a signaling identifier of the first signaling.

In one subembodiment of the above embodiment, the first signaling is a DCI signaling identified by the first identifier.

In one subembodiment of the above embodiment, the first identifier is used for generating a Reference Signal (RS) sequence of DeModulation Reference Signals (DMRS) for the first signaling.

In one subembodiment of the above embodiment, a Cyclic Redundancy Check (CRC) bit sequence for the first signaling is scrambled by the first identifier.

In one embodiment, the second signaling carries the first identifier.

In one subembodiment of the above embodiment, the first identifier is a signaling identifier of the second signaling.

In one subembodiment of the above embodiment, the second signaling is a DCI signaling identified by the first identifier.

In one subembodiment of the above embodiment, the first identifier is used for generating an RS sequence of DMRS for the second signaling.

In one subembodiment of the above embodiment, a CRC bit sequence for the second signaling is scrambled by the first identifier.

In one embodiment, the second identifier is a signaling identifier.

In one embodiment, the second identifier is a non-negative integer.

In one embodiment, the second identifier is an RNTI.

In one embodiment, the second identifier is a new-RNTI, the specific meaning of the new-RNTI can be found in 3GPP T S38.214, chapter 5.1.3.1.

In one embodiment, the first signaling carries the second identifier.

In one subembodiment of the above embodiment, the second identifier is a signaling identifier of the first signaling.

In one subembodiment of the above embodiment, the first signaling is a DCI signaling identified by the second identifier.

In one subembodiment of the above embodiment, the second identifier is used for generating an RS sequence of DMRS for the first signaling.

In one subembodiment of the above embodiment, a CRC bit sequence for the first signaling is scrambled by the second identifier.

In one embodiment, the second signaling carries the second identifier.

In one subembodiment of the above embodiment, the second identifier is a signaling identifier of the second signaling.

In one subembodiment of the above embodiment, the second signaling is a DCI signaling identified by the second identifier.

In one subembodiment of the above embodiment, the second identifier is used for generating an RS sequence of DMRS for the second signaling.

In one subembodiment of the above embodiment, a CRC bit sequence for the second signaling is scrambled by the second identifier.

In one embodiment, when the first signaling and the second signaling both carry a second identifier, whether the first time-frequency resource group and the second time-frequency resource group belong to a same resource subset out of the G resource subsets is used for determining whether the first bit block and the second bit block are respectively transmitted in the first time-frequency resource group and the second time-frequency resource group or are both transmitted in the third time-frequency resource group.

In one embodiment, if only the second signaling between the first signaling and the second signaling carries a second identifier (URLLC), whether the first time-frequency resource group and the second time-frequency resource group belong to a same resource subset out of the G resource subsets is used for determining whether the first bit block and the second bit block are respectively transmitted in the first time-frequency resource group and the second time-frequency resource group or are both transmitted in the third time-frequency resource group.

In one embodiment, if only the first signaling between the first signaling and the second signaling carries a second identifier (URLLC), whether the first time-frequency resource group and the second time-frequency resource group belong to a same resource subset out of the G resource subsets is used for determining whether the first bit block and the second bit block are respectively transmitted in the first time-frequency resource group and the second time-frequency resource group or are both transmitted in the third time-frequency resource group.

Embodiment 2

Figure 2:
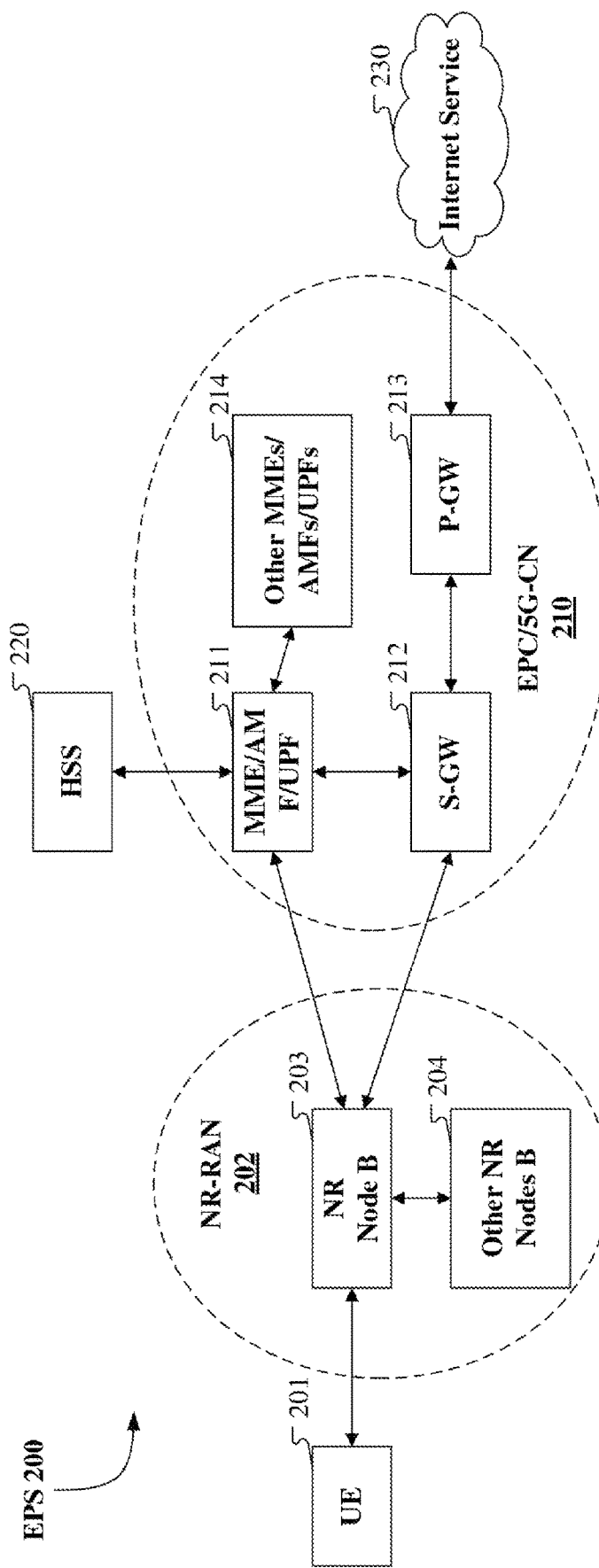
FIG. 2 illustrates a schematic diagram of a network architecture according to one embodiment of the present disclosure.

Embodiment 2 illustrates a schematic diagram of a network architecture, as shown in FIG. 2.

Embodiment 2 illustrates a schematic diagram of a network architecture according to the present disclosure, as shown in FIG. 2. FIG. 2 is a diagram illustrating a network architecture 200 of NR 5G, Long-Term Evolution (LTE) and Long-Term Evolution Advanced (LTE-A) systems. The NR 5G or LTE network architecture 200 may be called an Evolved Packet System (EPS) 200 or other applicable terminology. The EPS 200 may comprise one or more UEs 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services or other cellular networks. The NG-RAN 202 comprises an NR node B (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmit-Receive Point (TRP) or some other applicable terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, Satellite Mobile Communications, Global Positioning Systems (GPSs), multimedia devices, video devices, digital audio players (for example, MP3 players), cameras, game consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity/Authentication Management Field/User Plane Function (MME/AMF/UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE 201 corresponds to the UE in the present disclosure.

In one embodiment, the gNB203 corresponds to the base station in the present disclosure.

In one subembodiment, the UE 201 supports MIMO wireless communication.

In one subembodiment, the gNB203 supports MIMO wireless communication.

Embodiment 3

Figure 3:
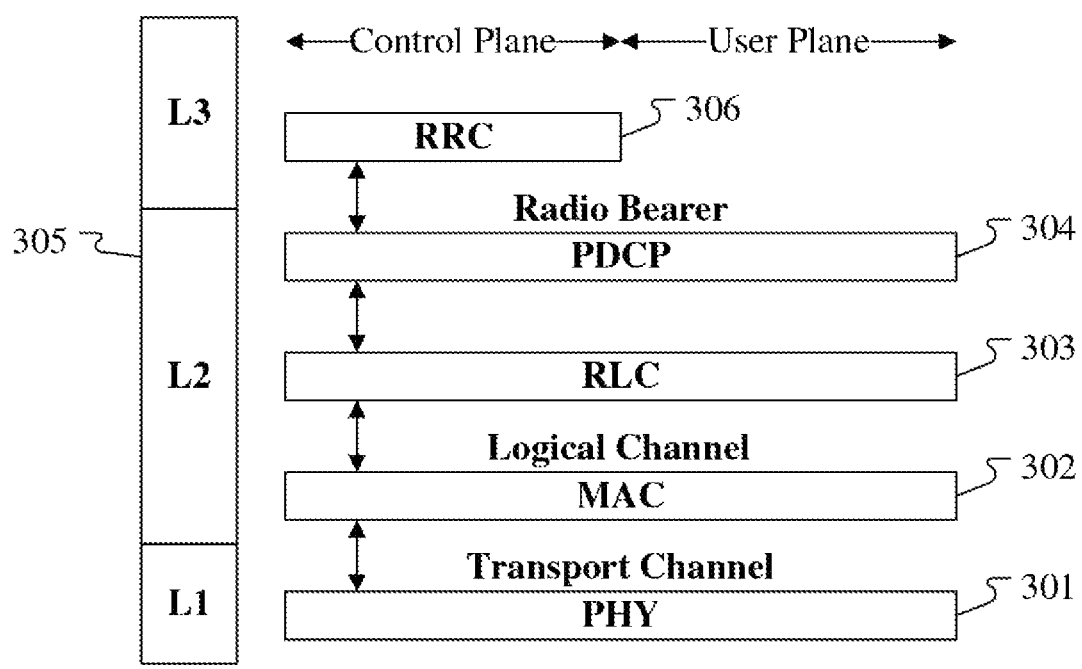
FIG. 3 illustrates a schematic diagram of an example of a radio protocol architecture of a user plane and a control plane according to one embodiment of the present disclosure.

Embodiment 3 illustrates a schematic diagram of an example of a radio protocol architecture of a user plane and a control plane according to one embodiment of the present disclosure, as shown in FIG. 3.

FIG. 3 is a schematic diagram illustrating an embodiment of a radio protocol architecture of a user plane and a control plane. In FIG. 3, the radio protocol architecture for a UE and a base station (gNB or eNB) is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the UE and the gNB via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the gNBs of the network side. Although not described in FIG. 3, the UE may comprise several higher layers above the L2 305, such as a network layer (i.e., IP layer) terminated at a P-GW 213 of the network side and an application layer terminated at the other side of the connection (i.e., a peer UE, a server, etc.). The PDCP sublayer 304 provides multiplexing among variable radio bearers and logical channels. The PDCP sublayer 304 also provides a header compression for a higher-layer packet so as to reduce a radio transmission overhead. The PDCP sublayer 304 provides security by encrypting a packet and provides support for UE handover between gNBs. The RLC sublayer 303 provides segmentation and reassembling of a higher-layer packet, retransmission of a lost packet, and reordering of a packet so as to compensate the disordered receiving caused by HARQ. The MAC sublayer 302 provides multiplexing between a logical channel and a transport channel. The MAC sublayer 302 is also responsible for allocating between UEs various radio resources (i.e., resource block) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression for the control plane. The control plane also comprises a Radio Resource Control (RRC) sublayer 306 in the layer 3 (L3). The RRC sublayer 306 is responsible for acquiring radio resources (i.e., radio bearer) and configuring the lower layer using an RRC signaling between the gNB and the UE.

In one embodiment, the radio protocol architecture in FIG. 3 is applicable to the UE in the present disclosure.

In one embodiment, the radio protocol architecture in FIG. 3 is applicable to the base station in the present disclosure.

In one embodiment, the first information in the present disclosure is generated by the RRC sublayer 306.

In one embodiment, the third information in the present disclosure is generated by the RRC sublayer 306.

In one embodiment, the second information in the present disclosure is generated by the RRC sublayer 306.

In one embodiment, the first signaling in the present disclosure is generated by the PHY 301.

In one embodiment, the second signaling in the present disclosure is generated by the PHY 301.

In one embodiment, the first radio signal in the present disclosure is generated by the PHY 301.

In one embodiment, the second radio signal in the present disclosure is generated by the PHY 301.

In one embodiment, a radio signal that transmits the first bit block of the present disclosure in the first time-frequency resource group of the present disclosure is generated by the PHY 301.

In one embodiment, a radio signal that transmits the second bit block of the present disclosure in the second time-frequency resource group of the present disclosure is generated by the PHY 301.

In one embodiment, a radio signal that transmits the first bit block and the second bit block of the present disclosure in the third time-frequency resource group of the present disclosure is generated by the PHY 301.

Embodiment 4

Figure 4:
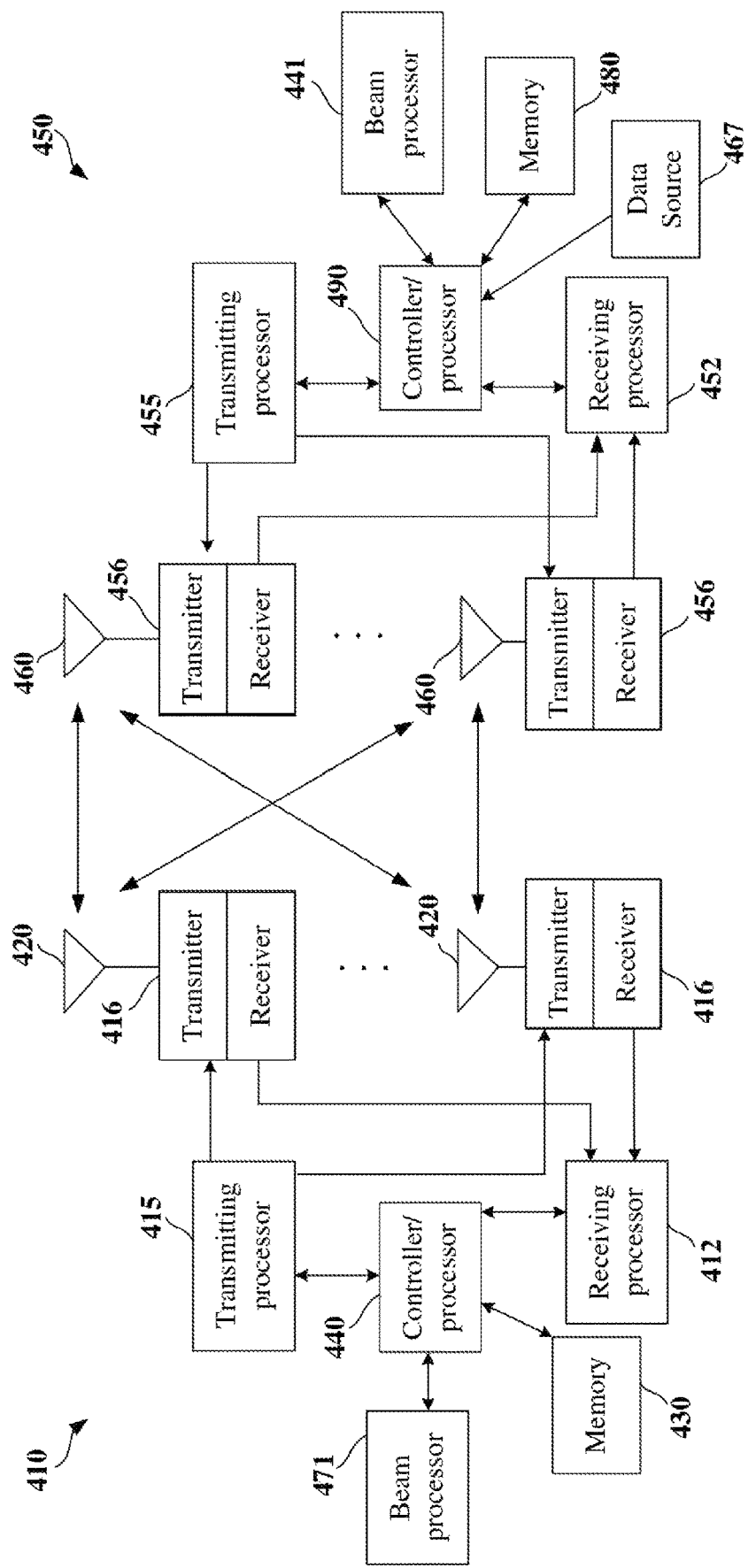
FIG. 4 illustrates a schematic diagram of an NR node and a UE according to one embodiment of the present disclosure.

Embodiment 4 illustrates a schematic diagram of a base station (NR node) and a UE according to the present disclosure, as shown in FIG. 4. FIG. 4 is a block diagram of a gNB 410 in communication with a UE 450 in an access network.

The base station (410) comprises a controller/processor 440, a memory 430, a receiving processor 412, a beam processor 471, a transmitting processor 415, a transmitter/receiver 416 and an antenna 420.

The UE (450) comprises a controller/processor 490, a memory 480, a data source 467, a beam processor 441, a transmitting processor 455, a receiving processor 452, a transmitter/receiver 456 and an antenna 460.

In downlink (DL) transmission, processes relevant to the base station (410) include the following:

A higher layer packet is provided to the controller/processor 440, the controller/processor 440 provides header compression, encryption, packet segmentation and reordering, and a multiplexing between a logical channel and a transport channel so as to implement the L2 layer protocols used for the user plane and the control plane; the higher layer packet may comprise data or control information, such as a Downlink Shared Channel (DL-SCH);

the controller/processor 440 is connected to the memory 430 that stores program codes and data, the memory 430 may be called a computer readable medium;

the controller/processor 440 comprises scheduling units for transmission requests, the scheduling units are used for scheduling radio resources corresponding to transmission requests.

the beam processor 471 determines a first signaling and a second signaling;

the transmitting processor 415 receives a bit stream output from the controller/processor 440, and performs signal transmitting processing functions of the L1 layer (that is, PHY), including coding, interleaving, scrambling, modulation, power control/allocation and generation of physical layer control signaling (such as PBCH, PDCCH, PHICH, PCFICH, reference signal), etc.;

the transmitting processor 415 receives a bit stream output from the controller/processor 440, and performs signal transmitting processing functions of the L1 layer (that is, PHY), including multi-antenna transmission, spreading, code division multiplexing, and precoding;

the transmitter 416 is configured to convert the baseband signal provided by the transmitting processor 415 into a radio frequency signal to be transmitted via the antenna 420; each transmitter 416 performs sampling processing on respective input symbol streams to obtain respective sampled signal streams. Each transmitter 416 performs further processing (for example, digital-to-analogue conversion, amplification, filtering, upconversion, etc.) on respective sampled streams to obtain a downlink signal.

In DL transmission, processes relevant to the UE (450) include the following:

The receiver 456 is configured to convert the radio frequency signal received by the antenna 460 into a baseband signal and provide the baseband signal to the receiving processor 452;

the receiving processor 452 implements various signal receiving processing functions used for the L1 layer (that is, PHY), including decoding, deinterleaving, descrambling, demodulation and extraction of physical layer control signaling;

the receiving processor 452 implements various signal receiving processing functions used for the L1 layer (that is, PHY), including multi-antenna reception, dispreading, code division multiplexing, and precoding;

the beam processor 441 determines a first signaling and a second signaling;

the controller/processor 490 receives a bit stream output from the receiving processor 452, provides header decompression, decryption, packet segmentation and reordering as well as a multiplexing and demultiplexing between a logical channel and a transport channel so as to implement the L2 layer protocols for the user plane and the control plane;

the controller/processor 490 is connected to the memory 480 that stores program codes and data. The memory 480 may be called a computer readable medium.

In uplink (UL) transmission, processes relevant to the base station (410) include the following:

The receiver 416 receives a radio frequency signal via a corresponding antenna 420, converts the received radio frequency signal into a baseband signal, and provides the baseband signal to the receiving processor 412;

the receiving processor 412 performs various signal receiving processing functions for the L1 layer (that is, PHY), including decoding, deinterleaving, descrambling, demodulation and extraction of physical layer control signaling;

the receiving processor 412 performs various signal receiving processing functions for the L1 layer (that is, PHY), including multi-antenna reception, despreading, code division multiplexing, and precoding, etc.;

the controller/processor 440 implements the functionality of the L2 layer, and is connected to the memory 430 that stores program codes and data;

the controller/processor 440 provides demultiplexing between a transport channel and a logical channel, packet reassembling, decryption, header decompression, and control signal processing to recover a higher layer packet coming from the UE 450; a higher layer packet from the controller/processor 440 can be provided to the core network;

the beam processor 471 determines that a first bit block is received in a first time-frequency resource group and a second bit block is received in a second time-frequency resource group, or, a first bit block and a second bit block are received in a third time-frequency resource group.

In UL transmission, processes relevant to the UE (450) include the following:

The data source 467 provides a higher layer packet to the controller/processor 490. The data source 467 represents all protocol layers above the L2 layer;

the transmitter 456 transmits a radio frequency signal via a corresponding antenna 460, converting the baseband signal into a radio frequency signal, and providing the radio frequency signal to a corresponding antenna 460;

the transmitting processor 455 performs various signal receiving processing functions for the L1 layer (that is, PHY), including coding, interleaving, scrambling, modulation and physical layer signaling generation;

the transmitting processor 455 performs various signal receiving processing functions for the L1 layer (that is, PHY), including multi-antenna transmission, spreading, code division multiplexing, and precoding;

the controller/processor 490 based on radio resource allocation for the gNB410 performs header compression, encryption, packet segmentation and reordering and multiplexing between a logical channel and a transport channel, so as to implement the L2 functionality used for the user plane and the control plane;

the controller/processor 490 is also in charge of HARQ operation, retransmission of a lost packet, and a signaling to the gNB410;

the beam processor 441 determines that a first bit block is transmitted in a first time-frequency resource group and a second bit block is transmitted in a second time-frequency resource group, or, a first bit block and a second bit block are transmitted in a third time-frequency resource group.

In one embodiment, the UE 450 comprises at least one processor and at least one memory. The at least one memory comprises computer program codes; the at least one memory and the computer program codes are configured to be used in collaboration with the at least one processor. The UE 450 at least receives a first signaling, the first signaling being used for indicating a first time-frequency resource group, the first time-frequency resource group being reserved for a first bit block; receives a second signaling, the second signaling being used for indicating a second time-frequency resource group, the second time-frequency resource group being reserved for a second bit block; and transmits the first bit block in the first time-frequency resource group and transmits the second bit block in the second time-frequency resource group, or, transmits the first bit block and the second bit block in a third time-frequency resource group; herein, the first time-frequency resource group, the second time-frequency resource group and the third time-frequency resource group are all time-frequency resource groups of G resource subsets, any of the G resource subsets comprises a positive integer number of time-frequency resource group(s), G is a positive integer greater than 1; when the first signaling and the second signaling both carry a first identifier, the first bit block and the second bit block are transmitted in the third time-frequency resource group; when at least one of the first signaling or the second signaling carries a second identifier, the second identifier being different from the first identifier, whether the first time-frequency resource group and the second time-frequency resource group belong to a same resource subset out of the G resource subsets is used for determining whether the first bit block and the second bit block are respectively transmitted in the first time-frequency resource group and the second time-frequency resource group or are both transmitted in the third time-frequency resource group.

In one embodiment, the UE 450 comprises a memory that stores a computer readable instruction program. The computer readable instruction program generates an action when executed by at least one processor. The action includes receiving a first signaling, the first signaling being used for indicating a first time-frequency resource group, the first time-frequency resource group being reserved for a first bit block; receiving a second signaling, the second signaling being used for indicating a second time-frequency resource group, the second time-frequency resource group being reserved for a second bit block; and transmitting the first bit block in the first time-frequency resource group and transmitting the second bit block in the second time-frequency resource group, or, transmitting the first bit block and the second bit block in a third time-frequency resource group; herein, the first time-frequency resource group, the second time-frequency resource group and the third time-frequency resource group are all time-frequency resource groups of G resource subsets, any of the G resource subsets comprises a positive integer number of time-frequency resource group(s), G is a positive integer greater than 1; when the first signaling and the second signaling both carry a first identifier, the first bit block and the second bit block are transmitted in the third time-frequency resource group; when at least one of the first signaling or the second signaling carries a second identifier, the second identifier being different from the first identifier, whether the first time-frequency resource group and the second time-frequency resource group belong to a same resource subset out of the G resource subsets is used for determining whether the first bit block and the second bit block are respectively transmitted in the first time-frequency resource group and the second time-frequency resource group or are both transmitted in the third time-frequency resource group.

In one embodiment, the gNB410 comprises at least one processor and at least one memory. The at least one memory comprises computer program codes. The at least one memory and the computer program codes are configured to be used in collaboration with the at least one processor. The gNB 410 at least transmits a first signaling, the first signaling being used for indicating a first time-frequency resource group, the first time-frequency resource group being reserved for a first bit block; transmits a second signaling, the second signaling being used for indicating a second time-frequency resource group, the second time-frequency resource group being reserved for a second bit block; and receives the first bit block in the first time-frequency resource group and receives the second bit block in the second time-frequency resource group, or, receives the first bit block and the second bit block in a third time-frequency resource group; herein, the first time-frequency resource group, the second time-frequency resource group and the third time-frequency resource group are all time-frequency resource groups of G resource subsets, any of the G resource subsets comprises a positive integer number of time-frequency resource group(s), G is a positive integer greater than 1; when the first signaling and the second signaling both carry a first identifier, the first bit block and the second bit block are received in the third time-frequency resource group; when at least one of the first signaling or the second signaling carries a second identifier, the second identifier being different from the first identifier, whether the first time-frequency resource group and the second time-frequency resource group belong to a same resource subset out of the G resource subsets is used for determining whether the first bit block and the second bit block are respectively received in the first time-frequency resource group and the second time-frequency resource group or are both received in the third time-frequency resource group.

In one embodiment, the gNB410 comprises a memory that stores a computer readable instruction program. The computer readable instruction program generates an action when executed by at least one processor. The action includes transmitting a first signaling, the first signaling being used for indicating a first time-frequency resource group, the first time-frequency resource group being reserved for a first bit block; transmitting a second signaling, the second signaling being used for indicating a second time-frequency resource group, the second time-frequency resource group being reserved for a second bit block; and receiving the first bit block in the first time-frequency resource group and receiving the second bit block in the second time-frequency resource group, or, receiving the first bit block and the second bit block in a third time-frequency resource group; herein, the first time-frequency resource group, the second time-frequency resource group and the third time-frequency resource group are all time-frequency resource groups of G resource subsets, any of the G resource subsets comprises a positive integer number of time-frequency resource group(s), G is a positive integer greater than 1; when the first signaling and the second signaling both carry a first identifier, the first bit block and the second bit block are received in the third time-frequency resource group; when at least one of the first signaling or the second signaling carries a second identifier, the second identifier being different from the first identifier, whether the first time-frequency resource group and the second time-frequency resource group belong to a same resource subset out of the G resource subsets is used for determining whether the first bit block and the second bit block are respectively received in the first time-frequency resource group and the second time-frequency resource group or are both received in the third time-frequency resource group.

In one embodiment, the UE 450 corresponds to the UE in the present disclosure.

In one embodiment, the gNB410 corresponds to the base station in the present disclosure.

In one embodiment, at least the first two of the receiver 456, the receiving processor 452 and the controller/processor 490 are used for receiving the first information in the present disclosure.

In one embodiment, at least the first two of the transmitter 416, the transmitting processor 415 and the controller/processor 440 are used for transmitting the first information in the present disclosure.

In one embodiment, at least the first two of the receiver 456, the receiving processor 452 and the controller/processor 490 are used for receiving the third information in the present disclosure.

In one embodiment, at least the first two of the transmitter 416, the transmitting processor 415 and the controller/processor 440 are used for transmitting the third information in the present disclosure.

In one embodiment, at least the first two of the receiver 456, the receiving processor 452 and the controller/processor 490 are used for receiving the second information in the present disclosure.

In one embodiment, at least the first two of the transmitter 416, the transmitting processor 415 and the controller/processor 440 are used for transmitting the second information in the present disclosure.

In one embodiment, at least the first two of the receiver 456, the receiving processor 452 and the controller/processor 490 are used for receiving the first signaling in the present disclosure.

In one embodiment, at least the first two of the transmitter 416, the transmitting processor 415 and the controller/processor 440 are used for transmitting the first signaling in the present disclosure.

In one embodiment, at least the first two of the receiver 456, the receiving processor 452 and the controller/processor 490 are used for receiving the first radio signal in the present disclosure.

In one embodiment, at least the first two of the transmitter 416, the transmitting processor 415 and the controller/processor 440 are used for transmitting the first radio signal in the present disclosure.

In one embodiment, at least the first two of the receiver 456, the receiving processor 452 and the controller/processor 490 are used for receiving the second signaling in the present disclosure.

In one embodiment, at least the first two of the transmitter 416, the transmitting processor 415 and the controller/processor 440 are used for transmitting the second signaling in the present disclosure.

In one embodiment, at least the first two of the receiver 456, the receiving processor 452 and the controller/processor 490 are used for receiving the second radio signal in the present disclosure.

In one embodiment, at least the first two of the transmitter 416, the transmitting processor 415 and the controller/processor 440 are used for transmitting the second radio signal in the present disclosure.

In one embodiment, at least the first two of the transmitter 456, the transmitting processor 455 and the controller/processor 490 are used for transmitting the first bit block in the present disclosure.

In one embodiment, at least the first two of the receiver 416, the receiving processor 412 and the controller/processor 440 are used for receiving the first bit block in the present disclosure.

In one embodiment, at least the first two of the transmitter 456, the transmitting processor 455 and the controller/processor 490 are used for transmitting the second bit block in the present disclosure.

In one embodiment, at least the first two of the receiver 416, the receiving processor 412 and the controller/processor 440 are used for receiving the second bit block in the present disclosure.

Embodiment 5

Figure 5:
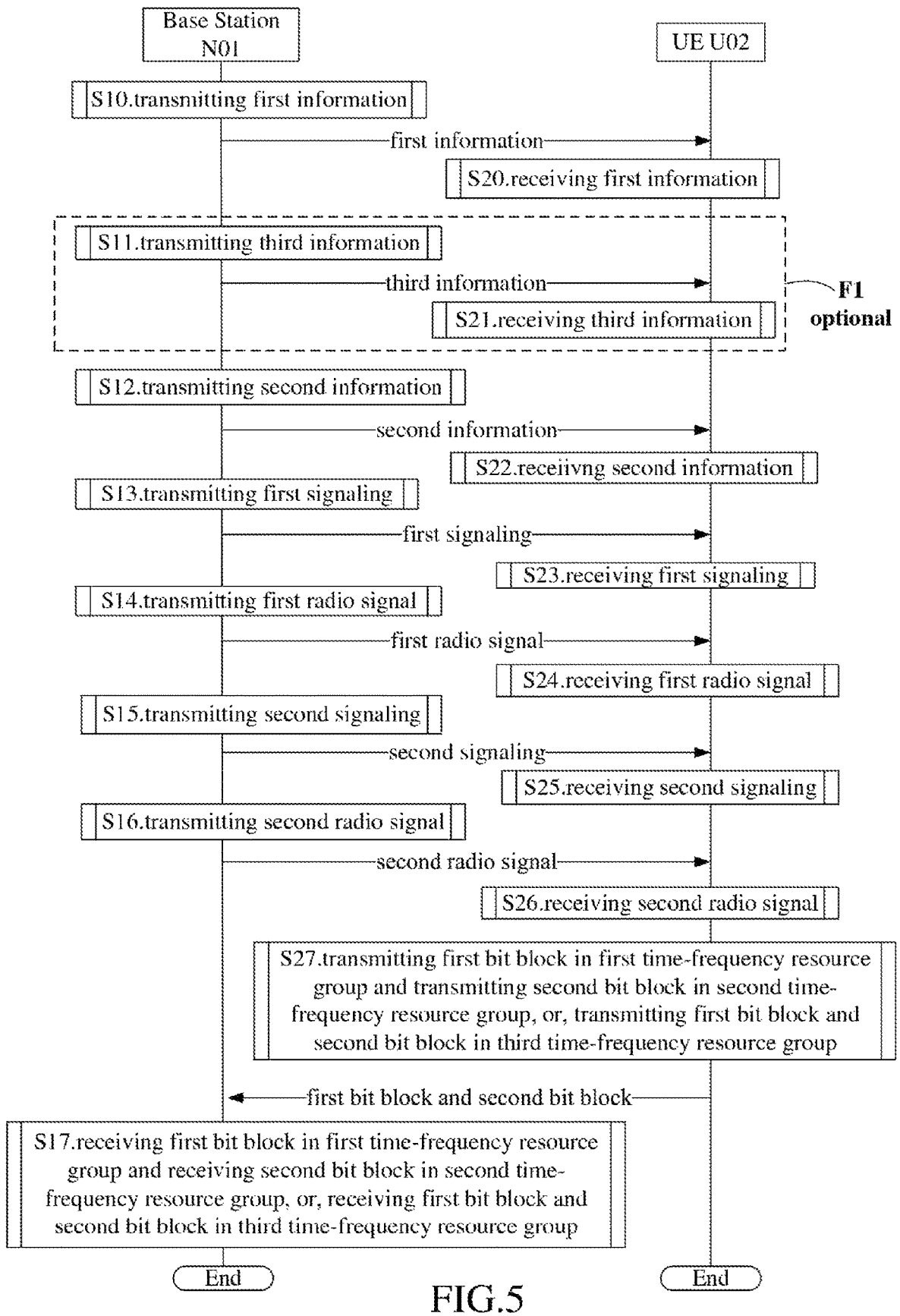
FIG. 5 illustrates a flowchart of wireless transmission according to one embodiment of the present disclosure.

Embodiment 5 illustrates a flowchart of wireless transmission, as shown in FIG. 5. In FIG. 5, a base station N01 is a maintenance base station for a serving cell of a UE U02. In FIG. 5, steps in box F1 are optional.

The base station N01 transmits first information in step S10; transmits third information in step S11; transmits second information in step S12; transmits a first signaling in step S13; transmits a first radio signal in step S14; transmits a second signaling in step S15; transmits a second radio signal in step S16; receives a first bit block in a first time-frequency resource group and receives a second bit block in a second time-frequency resource group, or receives a first bit block and a second bit block in a third time-frequency resource group in step S17.

The UE U02 receives first information in step S20; receives third information in step S21; receives second information in step S22; receives a first signaling in step S23; receives a first radio signal in step S24; receives a second signaling in step S25; receives a second radio signal in step S26; transmits a first bit block in a first time-frequency resource group and transmits a second bit block in a second time-frequency resource group, or, transmits a first bit block and a second bit block in a third time-frequency resource group in step S27.

In Embodiment 5, the first signaling is used for indicating a first time-frequency resource group, the first time-frequency resource group being reserved for a first bit block; the second signaling is used for indicating a second time-frequency resource group, the second time-frequency resource group being reserved for a second bit block; the first time-frequency resource group, the second time-frequency resource group and the third time-frequency resource group are all time-frequency resource groups of G resource subsets, any of the G resource subsets comprises a positive integer number of time-frequency resource group(s), G is a positive integer greater than 1; when the first signaling and the second signaling both carry a first identifier, the first bit block and the second bit block are transmitted in the third time-frequency resource group; when at least one of the first signaling or the second signaling carries a second identifier, the second identifier being different from the first identifier, whether the first time-frequency resource group and the second time-frequency resource group belong to a same resource subset out of the G resource subsets is used by the U02 for determining whether the first bit block and the second bit block are respectively transmitted in the first time-frequency resource group and the second time-frequency resource group or are both transmitted in the third time-frequency resource group. The first information is used for indicating the first identifier and the second identifier, the first bit block is used for indicating whether the first radio signal is correctly received, the second bit block is used for indicating whether the second radio signal is correctly received; when the first signaling carries the first identifier, the first signaling is used for indicating an MCS employed by the first radio signal out of a first MCS set; when the first signaling carries the second identifier, the first signaling is used for indicating an MCS employed by the first radio signal out of a second MCS set; when the second signaling carries the first identifier, the second signaling is used for indicating an MCS employed by the second radio signal out of the first MCS set; when the second signaling carries the second identifier, the second signaling is used for indicating an MCS employed by the second radio signal out of the second MCS set; a target BLER of the first MCS set is greater than a target BLER of the second MCS set. The second information is used for indicating the G resource subsets. The third information is used for indicating N time-frequency resource group sets, any of the N time-frequency resource group sets comprises a positive integer number of time-frequency resource group(s), any of the G resource subsets is composed of a positive integer number of time-frequency resource group(s) out of the N time-frequency resource groups sets, N is a positive integer; the first time-frequency resource group is a time-frequency resource group out of a first time-frequency resource group set, the second time-frequency resource group is a time-frequency resource group out of a second time-frequency resource group set, the third time-frequency resource group is a time-frequency resource group out of a third time-frequency resource group set; the first time-frequency resource group set, the second time-frequency resource group set and the third time-frequency resource group set are all time-frequency resource group sets of the N time-frequency resource group sets.

In one embodiment, the first radio signal comprises data.

In one embodiment, the first radio signal comprises data and DMRS.

In one embodiment, the data comprised by the first radio signal is downlink data.

In one embodiment, a transmission channel for the first radio signal is a Downlink Shared Channel (DL-SCH).

In one embodiment, the first radio signal is transmitted on a downlink physical layer data channel (i.e., a downlink channel capable of carrying physical layer data).

In one subembodiment of the above embodiment, the downlink physical layer data channel is a PDSCH.

In one subembodiment of the above embodiment, the downlink physical layer data channel is an sPDSCH.

In one subembodiment of the above embodiment, the downlink physical layer data channel is an NR-PDSCH.

In one subembodiment of the above embodiment, the downlink physical layer data channel is an NB-PDSCH.

In one embodiment, the second radio signal comprises data.

In one embodiment, the second radio signal comprises data and DMRS.

In one embodiment, the data comprised by the second radio signal is downlink data.

In one embodiment, a transmission channel for the second radio signal is a DL-SCH.

In one embodiment, the second radio signal is transmitted on a downlink physical layer data channel (i.e., a downlink channel capable of carrying physical layer data).

In one subembodiment of the above embodiment, the downlink physical layer data channel is a PDSCH.

In one subembodiment of the above embodiment, the downlink physical layer data channel is an sPDSCH.

In one subembodiment of the above embodiment, the downlink physical layer data channel is an NR-PDSCH.

In one subembodiment of the above embodiment, the downlink physical layer data channel is an NB-PDSCH.

In one embodiment, the first bit block explicitly indicates whether the first radio signal is correctly received.

In one embodiment, the first bit block implicitly indicates whether the first radio signal is correctly received.

In one embodiment, the first bit block carries HARQ-ACK feedback corresponding to the first radio signal.

In one embodiment, part of bits in the first bit block carry HARQ-ACK feedback corresponding to the first radio signal.

In one embodiment, all bits in the first bit block carry HARQ-ACK feedback corresponding to the first radio signal.

In one embodiment, the second bit block explicitly indicates whether the second radio signal is correctly received.

In one embodiment, the second bit block implicitly indicates whether the second radio signal is correctly received.

In one embodiment, the second bit block carries HARQ-ACK feedback corresponding to the second radio signal.

In one embodiment, part of bits in the second bit block carry HARQ-ACK feedback corresponding to the second radio signal.

In one embodiment, all bits in the second bit block carry HARQ-ACK feedback corresponding to the second radio signal.

In one embodiment, the first MCS set comprises a positive integer number of Modulation and Coding Scheme(s).

In one embodiment, the second MCS set comprises a positive integer number of Modulation and Coding Scheme(s).

In one embodiment, the target BLER of the first MCS set is equal to 0.1, the target BLER of the second MCS set is less than 0.1.

In one subembodiment of the above embodiment, the target BLER of the second MCS set is equal to 0.01.

In one subembodiment of the above embodiment, the target BLER of the second MCS set is equal to 0.001.

In one subembodiment of the above embodiment, the target BLER of the second MCS set is equal to 0.00001.

In one subembodiment of the above embodiment, the target BLER of the second MCS set is equal to 0.000001.

In one embodiment, the target BLER of the first MCS set is less than 0.1, the target BLER of the second MCS set is less than the target BLER of the first MCS set.

In one subembodiment, the target BLER of the first MCS set is equal to 0.01, the target BLER of the second MCS set is equal to one of 0.001, 0.00001 and 0.000001.

In one subembodiment, the target BLER of the first MCS set is equal to 0.001, the target BLER of the second MCS set is equal to 0.00001 or 0.000001.

In one subembodiment, the target BLER of the first MCS set is equal to 0.00001, the target BLER of the second MCS set is equal to 0.000001.

In one embodiment, the first information is semi-statically configured.

In one embodiment, the first information is carried by a higher layer signaling.

In one embodiment, the first information is carried by an RRC signaling.

In one embodiment, the first information comprises one or more Information Elements (IEs) of an RRC signaling.

In one embodiment, the first information comprises all or part of an IE of an RRC signaling.

In one embodiment, the first information comprises an RNTI-Value IE, the specific meaning of the RNTI-Value IE can be found in 3GPP TS38.331, chapter 6.3.2.

In one embodiment, the first information comprises multiple IEs of an RRC signaling.

In one embodiment, the first information explicitly indicates the first identifier and the second identifier.

In one embodiment, the first information implicitly indicates the first identifier and the second identifier.

In one embodiment, the second information is semi-statically configured.

In one embodiment, the second information is carried by a higher layer signaling.

In one embodiment, the second information is carried by an RRC signaling.

In one embodiment, the second information comprises one or more IEs of an RRC signaling.

In one embodiment, the second information comprises all or part of an IE of an RRC signaling.

In one embodiment, the second information comprises multiple IEs of an RRC signaling.

In one embodiment, the second information explicitly indicates the G resource sub sets.

In one embodiment, the second information implicitly indicates the G resource sub sets.

In one embodiment, the second information comprises configuration information of each time-frequency resource group out of the G resource subsets.

In one embodiment, configuration information of any time-frequency resource group out of the G resource subsets comprises at least one of occupied time domain resources, occupied code domain resources, occupied frequency domain resources or a corresponding antenna port set.

In one embodiment, configuration information of any time-frequency resource group out of the G resource subsets comprises occupied time domain resources, occupied code domain resources, occupied frequency domain resources or a corresponding antenna port set.

In one embodiment, configuration information of any time-frequency resource group out of the G resource subsets comprises occupied initial multicarrier symbol, a number of multicarrier symbols occupied, an initial Physical Resource Block (PRB) before or without frequency hopping, an initial PRB after frequency hopping, a number of PRBs occupied, configuration of frequency hopping, Cyclic Shift (CS), an Orthogonal Cover Code (OCC), OCC length, a corresponding antenna port set and a maximum code rate.

In one embodiment, configuration information of any time-frequency resource group out of the G resource subsets comprises at least one of occupied initial multicarrier symbol, a number of multicarrier symbols occupied, an initial PRB before or without frequency hopping, an initial PRB after frequency hopping, a number of PRBs occupied, configuration of frequency hopping, CS, an OCC, OCC length, a corresponding antenna port set or a maximum code rate.

In one embodiment, the second information is used for indicating a time-frequency resource group(s) comprised in each of the G resource subsets out of the N time-frequency resource group sets.

In one embodiment, the second information indicates an index(indices) of time-frequency resource group(s) comprised in each of the G resource subsets.

In one embodiment, the second information indicates an index(indices) of time-frequency resource group(s) comprised in each of the G resource subsets in the N time-frequency resource group sets.

In one embodiment, the second information indicates an index of each time-frequency resource group comprised by each of the G resource subsets in one of the N time-frequency resource group sets to which the time-frequency resource group belongs.

In one embodiment, the third information is semi-statically configured.

In one embodiment, the third information is carried by a higher layer signaling.

In one embodiment, the third information is carried by an RRC signaling.

In one embodiment, the third information comprises one or more IEs of an RRC signaling.

In one embodiment, the third information comprises all or part of an IE of an RRC signaling.

In one embodiment, the third information comprises multiple IEs of an RRC signaling.

In one embodiment, the third information explicitly indicates the N time-frequency resource group sets.

In one embodiment, the third information implicitly indicates the N time-frequency resource group sets.

In one embodiment, the third information comprises configuration information of each time-frequency resource group out of the N time-frequency resource group sets.

In one embodiment, configuration information of any time-frequency resource group out of the N time-frequency resource group sets comprises at least one of occupied time domain resources, occupied code domain resources, occupied frequency domain resources or a corresponding antenna port set.

In one embodiment, configuration information of any time-frequency resource group out of the N time-frequency resource group sets comprises occupied time domain resources, occupied code domain resources, occupied frequency domain resources and a corresponding antenna port set.

In one embodiment, configuration information of any time-frequency resource group out of the N time-frequency resource group sets comprises occupied initial multicarrier symbol, a number of multicarrier symbols occupied, an initial PRB before or without frequency hopping, an initial PRB after frequency hopping, a number of PRBs occupied, configuration of frequency hopping, CS, an OCC, OCC length, a corresponding antenna port set and a maximum code rate.

In one embodiment, configuration information of any time-frequency resource group out of the N time-frequency resource group sets comprises at least one of occupied initial multicarrier symbol, a number of multicarrier symbols occupied, an initial PRB before or without frequency hopping, an initial PRB after frequency hopping, a number of PRBs occupied, configuration of frequency hopping, CS, an OCC, OCC length, a corresponding antenna port set or a maximum code rate.

In one embodiment, the N is greater than 1.

In one embodiment, the N is equal to 1.

In one embodiment, the N time-frequency resource group sets are respectively N PUCCH resource sets, the specific meaning of the PUCCH resource sets can be found in 3GPP T S38.213, chapter 9.2.1.

In one embodiment, the N time-frequency resource group sets respectively correspond to N payload ranges.

In one embodiment, the N time-frequency resource group sets respectively correspond to N bit number ranges.

In one subembodiment of the above embodiment, N is equal to 4, the N bit number ranges are [1, 2], (2, N2], (N2, N3] and (N3, 1706], respectively, wherein the N2 and the N3 are configured by a higher signaling.

In one subembodiment of the above embodiment, N is equal to 4, the N bit number ranges are [1, 2], (2, N2], (N2, N3] and [N3, 1706], respectively, wherein the N2 and the N3 are configured by a higher signaling.

In one embodiment, a time-frequency resource group out of the N time-frequency resource group sets only belongs to one of the G resource subsets.

In one embodiment, any time-frequency resource group out of the N time-frequency resource group sets only belongs to one of the G resource subsets.

In one embodiment, the first signaling is used for indicating the first time-frequency resource group out of the first time-frequency resource group set.

In one embodiment, the second signaling is used for indicating the second time-frequency resource group out of the second time-frequency resource group set.

In one embodiment, the second signaling is used for indicating the third time-frequency resource group out of the third time-frequency resource group set.

Embodiment 6

Figure 6:
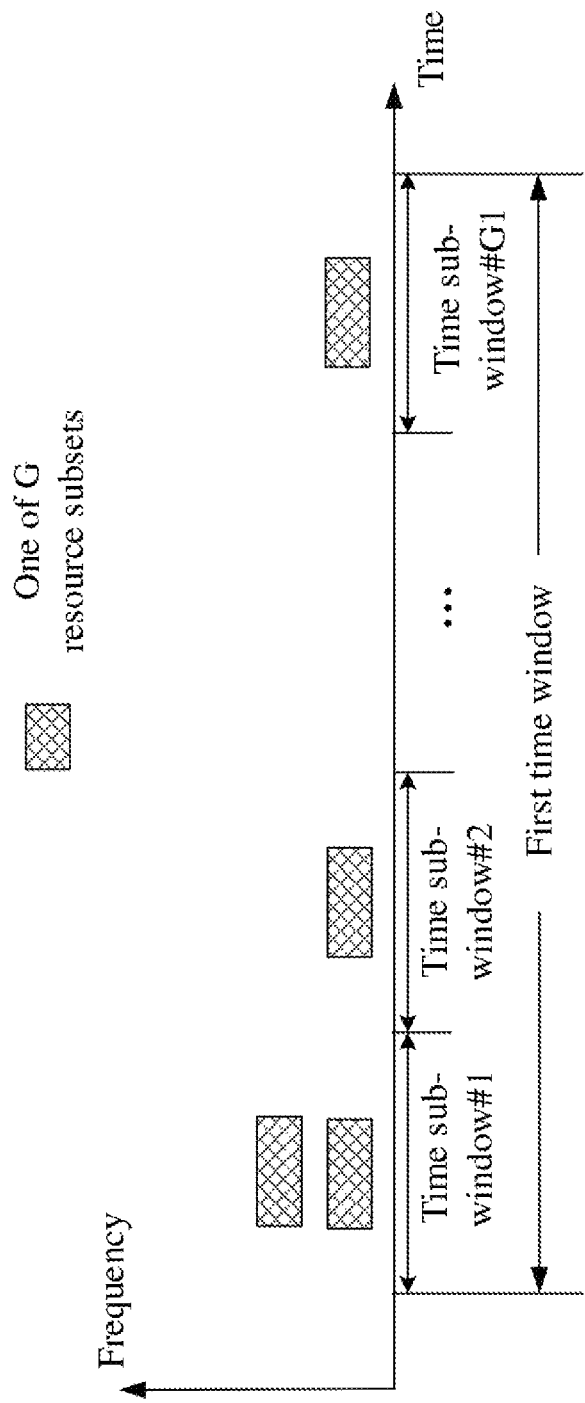
FIG. 6 illustrates a flowchart of relations between G resource subsets and G1 time sub-windows according to one embodiment of the present disclosure.

Embodiment 6 illustrates a flowchart of relations between G resource subsets and G1 time sub-windows, as shown in FIG. 6.

In Embodiment 6, the G resource subsets all belong to a first time window in time domain, the first time window comprises G1 time sub-windows, any two of the G1 time sub-windows are orthogonal, G1 is a positive integer greater than 1 and no greater than the G; any of the G resource subsets belongs to only one of the G1 time sub-windows in time domain, any of the G1 time sub-windows comprises time domain resources occupied by at least one of the G resource subsets; at least one of the first signaling or the second signaling of the present disclosure carries the second identifier of the present disclosure, whether the first time-frequency resource group and the second time-frequency resource group belong to a same time sub-window out of the G1 time sub-windows is used for determining whether the first bit block and the second bit block are respectively transmitted in the first time-frequency resource group and the second time-frequency resource group or are both transmitted in the third time-frequency resource group.

In one embodiment, the G1 is equal to the G.

In one embodiment, the G1 is less than the G.

In one embodiment, the G1 is equal to the G, any of the G1 time sub-windows comprises time domain resources occupied by only one resource subset of the G resource sub sets.

In one embodiment, the G1 is equal to the G, the G resource subsets belong to the G1 time sub-windows respectively in time domain.

In one embodiment, time domain resources occupied by the first time-frequency resource group and time domain resources occupied by the second time-frequency resource group both belong to a first time window.

In one embodiment, the first time window comprises a slot.

In one embodiment, the first time window comprises a subframe.

In one embodiment, the first time window comprises a positive integer number of consecutive multicarrier symbols.

In one embodiment, any of the G1 time sub-windows comprises a positive integer number of consecutive multicarrier symbols.

In one embodiment, not any two of the G1 time sub-windows comprise a same multicarrier symbol.

In one embodiment, when the first signaling and the second signaling both carry the second identifier, whether the first time-frequency resource group and the second time-frequency resource group belong to the same time sub-window out of the G1 time sub-windows in time domain is used for determining whether the first bit block and the second bit block are respectively transmitted in the first time-frequency resource group and the second time-frequency resource group or are both transmitted in the third time-frequency resource group.

In one embodiment, if only the second signaling between the first signaling and the second signaling carries the second identifier, whether the first time-frequency resource group and the second time-frequency resource group belong to the same time sub-window out of the G1 time sub-windows in time domain is used for determining whether the first bit block and the second bit block are respectively transmitted in the first time-frequency resource group and the second time-frequency resource group or are both transmitted in the third time-frequency resource group.

In one embodiment, if only the first signaling between the first signaling and the second signaling carries the second identifier (URLLC), whether the first time-frequency resource group and the second time-frequency resource group belong to the same time sub-window out of the G1 time sub-windows in time domain is used for determining whether the first bit block and the second bit block are respectively transmitted in the first time-frequency resource group and the second time-frequency resource group or are both transmitted in the third time-frequency resource group.

Embodiment 7

Figure 7:
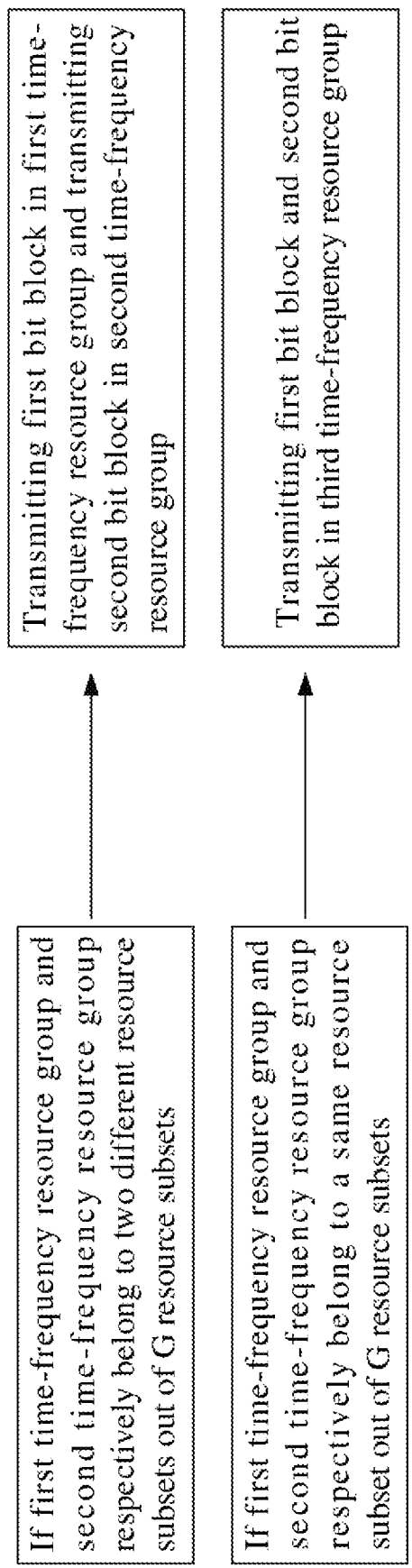
FIG. 7 illustrates a schematic diagram of determining transmission of a first bit block and a second bit block according to one embodiment of the present disclosure.

Embodiment 7 illustrates a schematic diagram of determining transmission of a first bit block and a second bit block, as shown in FIG. 7.

In Embodiment 7, at least one of the first signaling or the second signaling of the present disclosure carries the second identifier of the present disclosure; when the first time-frequency resource group and the second time-frequency resource group in the present disclosure respectively belong to two different resource subsets out of the G resource subsets in the present disclosure, the first bit block is transmitted in the first time-frequency resource group and the second bit block is transmitted in the second time-frequency resource group; when both the first time-frequency resource group and the second time-frequency resource group belong to a same resource subset of the G resource subsets, the first bit block and the second bit block are transmitted in the third time-frequency resource group in the present disclosure.

In one embodiment, whether the first time-frequency resource group and the second time-frequency resource group belong to a same resource subset out of the G resource subsets is used for determining whether the first bit block and the second bit block are respectively received in the first time-frequency resource group and the second time-frequency resource group or are both received in the third time-frequency resource group.

In one embodiment, at least one of the first signaling or the second signaling carries a second identifier.

In one embodiment, both the first signaling and the second signaling carry the second identifier.

In one embodiment, only the second signaling between the first signaling and the second signaling carries the second identifier.

In one embodiment, only the first signaling between the first signaling and the second signaling carries the second identifier.

Embodiment 8

Figure 8:
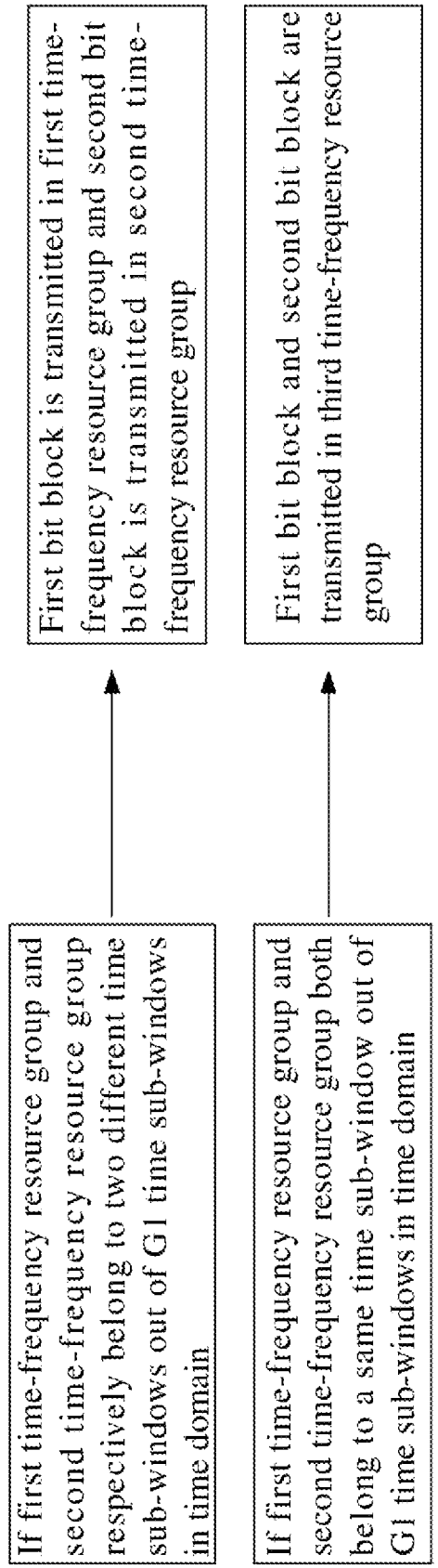
FIG. 8 illustrates a schematic diagram of determining transmission of a first bit block and a second bit block according to another embodiment of the present disclosure.

Embodiment 8 illustrates another schematic diagram of determining transmission of a first bit block and a second bit block, as shown in FIG. 8.

In Embodiment 8, at least one of the first signaling or the second signaling of the present disclosure carries the second identifier of the present disclosure; when the first time-frequency resource group and the second time-frequency resource group of the present disclosure respectively belong to two different time sub-windows out of the G1 time sub-windows of the present disclosure in time domain, the first bit block is transmitted in the first time-frequency resource group and the second bit block is transmitted in the second time-frequency resource group; when both the first time-frequency resource group and the second time-frequency resource group belong to a same time sub-window out of the G1 time sub-windows in time domain, the first bit block and the second bit block are transmitted in the third time-frequency resource group.

In one embodiment, whether the first time-frequency resource group and the second time-frequency resource group belong to a same time sub-window out of the G1 time sub-windows is used for determining whether the first bit block and the second bit block are respectively transmitted in the first time-frequency resource group and the second time-frequency resource group or are both transmitted in the third time-frequency resource group.

In one subembodiment, at least one of the first signaling or the second signaling carries the second identifier.

In one embodiment, both the first signaling and the second signaling carry the second identifier.

In one embodiment, only the second signaling between the first signaling and the second signaling carries the second identifier.

In one embodiment, only the first signaling between the first signaling and the second signaling carries the second identifier.

Embodiment 9

Figure 9:
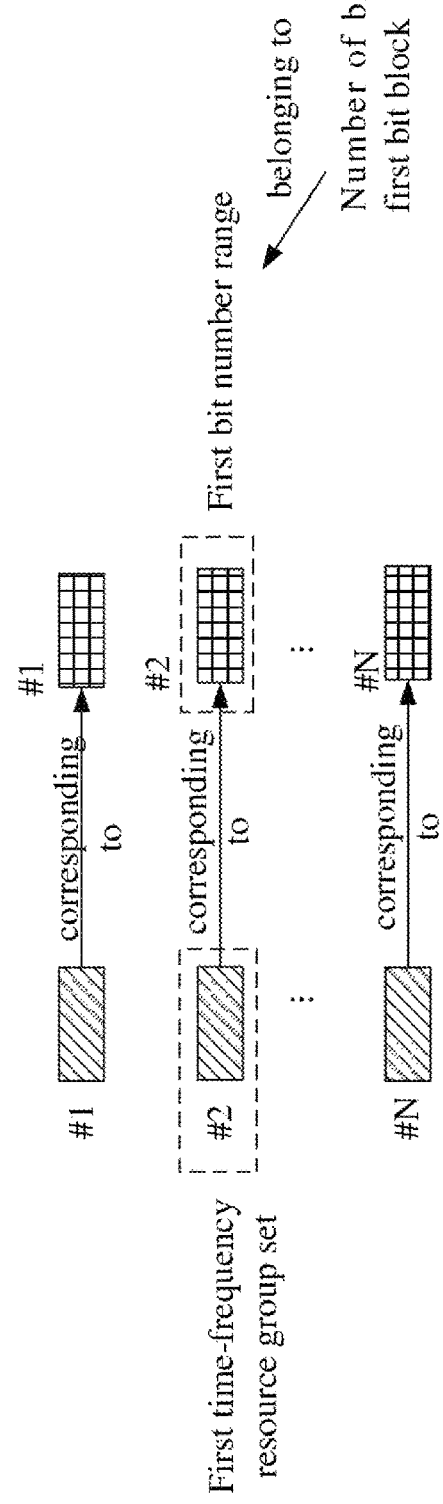
FIG. 9 illustrates a schematic diagram of determining a first time-frequency resource group set according to one embodiment of the present disclosure.

Embodiment 9 illustrates a schematic diagram of determining a first time-frequency resource group set, as shown in FIG. 9.

In Embodiment 9, the number of bits comprised in the first bit block of the present disclosure is used for determine the first time-frequency resource group set out of the N time-frequency resource group sets, the N is greater than 1.

In one embodiment, the N time-frequency resource group sets respectively correspond to N bit number ranges, a number of bits comprised in the first bit block belongs to a first bit number range, the first bit number range is one of the N bit number ranges, the first time-frequency resource group set is one of the N time-frequency resource group sets corresponding to the first bit number range.

In one embodiment, any bit number range of the N bit number ranges comprises a positive integer number of positive integer(s).

In one embodiment, any two of the N bit number ranges are different.

In one embodiment, not any two of the N bit number ranges comprise a same integer.

In one embodiment, N is equal to 4, the N bit number ranges are [1, 2], (2, N2], (N2, N3] and (N3, 1706] respectively, wherein the N2 and the N3 are configured by a higher layer signaling.

In one embodiment, N is equal to 4, the N bit number ranges are [1, 2], (2, N2], (N2, N3] and [N3, 1706] respectively, wherein the N2 and the N3 are configured by a higher layer signaling.

Embodiment 10

Figure 10:
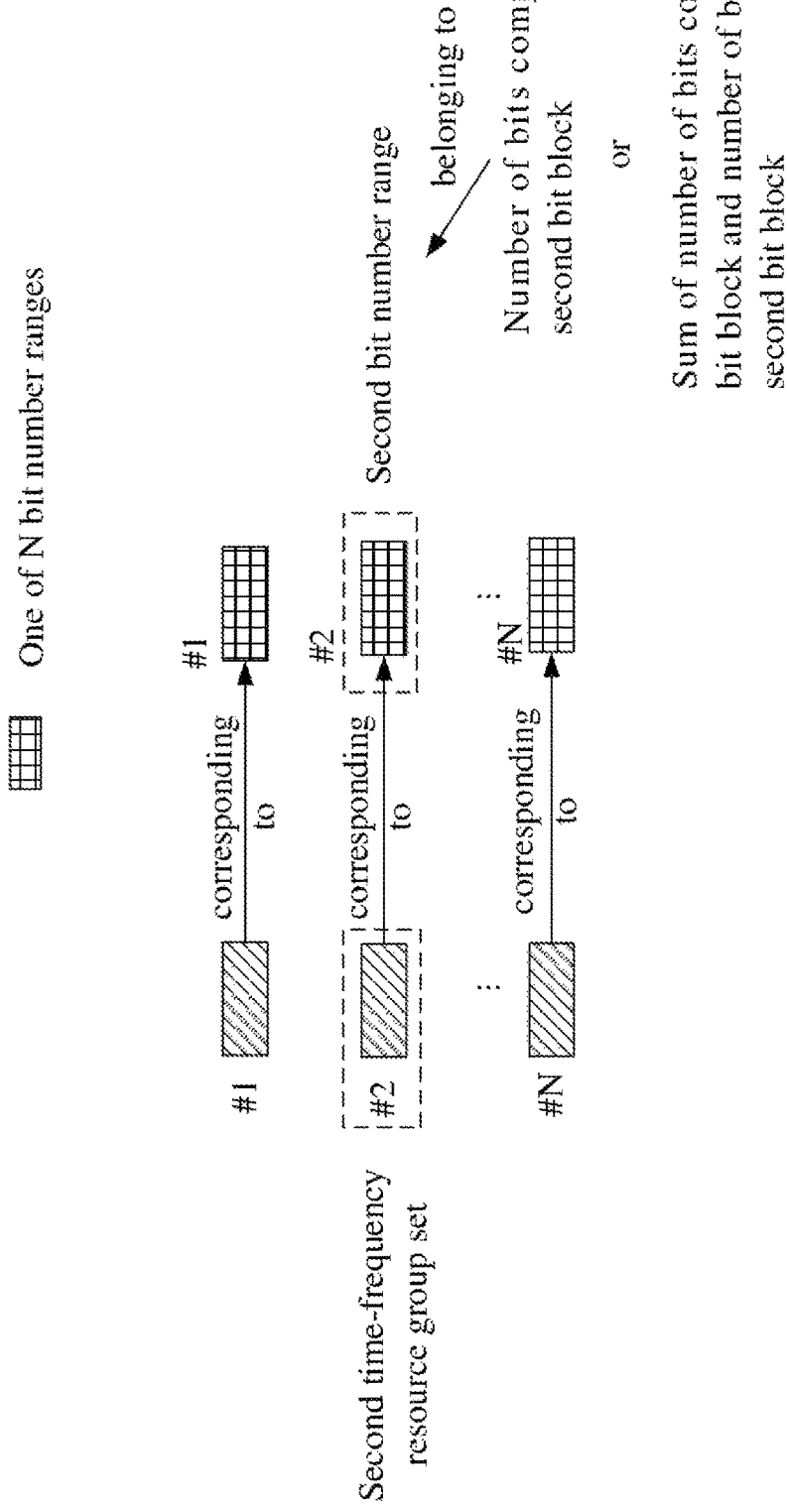
FIG. 10 illustrates a schematic diagram of determining a second time-frequency resource group set according to another embodiment of the present disclosure.

Embodiment 10 illustrates a schematic diagram of determining a second time-frequency resource group set, as shown in FIG. 10.

In Embodiment 10, the number of bits comprised in the second bit block of the present disclosure is used for determining the second time-frequency resource group set out of the N time-frequency resource group sets of the present disclosure, or, a sum of the number of bits comprised in the first bit block and the number of bits comprised in the second bit block of the present disclosure is used for determining the second time-frequency resource group set out of the N time-frequency resource group sets, the N is greater than 1.

In one embodiment, the number of bits comprised in the second bit block is used for determining the second time-frequency resource group set out of the N time-frequency resource group sets.

In one subembodiment of the above embodiment, the N time-frequency resource group sets respectively correspond to the N bit number ranges in the present disclosure, the number of bits comprised in the second bit block belongs to a second bit number range, the second bit number range is one of the N bit number ranges, the second time-frequency resource group set is one of the N time-frequency resource group sets corresponding to the second bit number range.

In one embodiment, a sum of the number of bits comprised in the first bit block and the number of bits comprised in the second bit block is used for determining the second time-frequency resource group set out of the N time-frequency resource group sets.

In one subembodiment of the above embodiment, the N time-frequency resource group sets respectively correspond to the N bit number ranges in the present disclosure, the sum of the number of bits comprised in the first bit block and the number of bits comprised in the second bit block belongs to a second bit number range, the second bit number range is one of the N bit number ranges, the second time-frequency resource group set is one of the N time-frequency resource group sets corresponding to the second bit number range.

Embodiment 11

Figure 11:
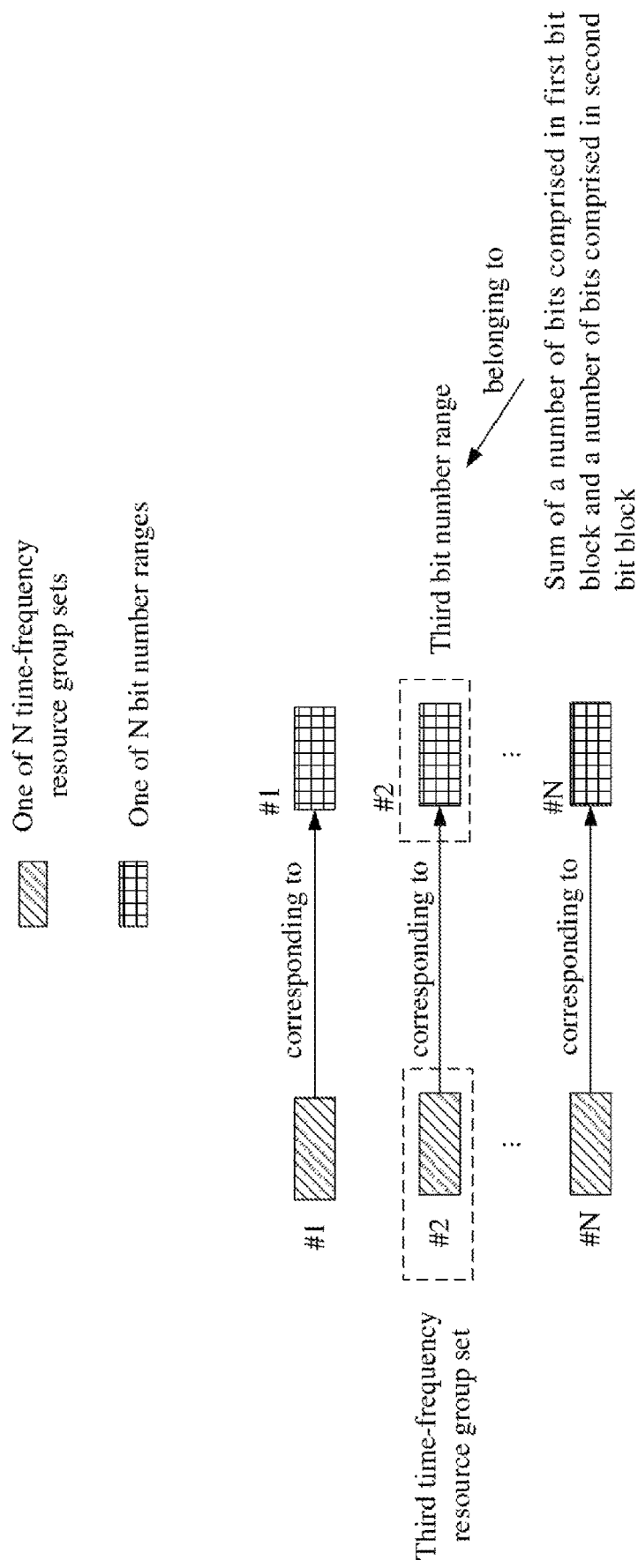
FIG. 11 illustrates a schematic diagram of determining a third time-frequency resource group set according to one embodiment of the present disclosure.

Embodiment 11 illustrates a schematic diagram of determining a third time-frequency resource group set, as shown in FIG. 11.

In Embodiment 11, a sum of the number of bits comprised in the first bit block and the number of bits comprised in the second bit block in the present disclosure is used for determining the third time-frequency resource group set out of the N time-frequency resource group sets in the present disclosure.

In one embodiment, the N time-frequency resource group sets respectively correspond to the N bit number ranges of the present disclosure, a sum of the number of bit comprised in the first bit block and the number of bits comprised in the second bit block belongs to a third bit number range, the third bit number range is one of the N bit number ranges, the third time-frequency resource group set is one of the N time-frequency resource group sets corresponding to the third bit number range.

In one embodiment, the third time-frequency resource group is the same as the second time-frequency resource group, a sum of the number of bits comprised in the first bit block and the number of bits comprised in the second bit block is used for determining the second time-frequency resource group set out of the N time-frequency resource group sets.

In one embodiment, the third time-frequency resource group is different from the second time-frequency resource group, the number of bits comprised in the second bit block is used for determining the second time-frequency resource group set out of the N time-frequency resource group sets.

Embodiment 12

Figure 12:
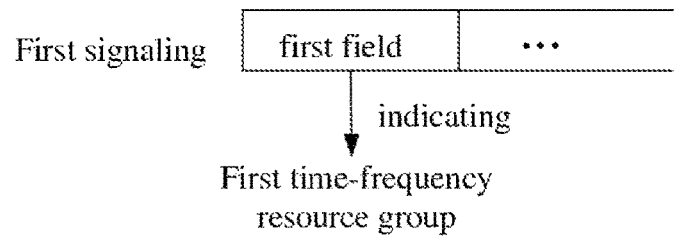
FIG. 12 illustrates a schematic diagram of a first signaling according to one embodiment of the present disclosure.

Embodiment 12 illustrates a schematic diagram of a first signaling, as shown in FIG. 12.

In Embodiment 12, the first signaling comprises a first field, the first field comprised by the first signaling is used for indicating the first time-frequency resource group of the present disclosure.

In one embodiment, the first field comprised by the first signaling comprises a positive integer number of bit(s).

In one embodiment, the first field comprised by the first signaling explicitly indicates the first time-frequency resource group.

In one embodiment, the first field comprised by the first signaling implicitly indicates the first time-frequency resource group.

In one embodiment, the first field comprised by the first signaling is used for indicating the first time-frequency resource group out of the first time-frequency resource group set in the present disclosure, the first time-frequency resource group set comprises a positive integer number of time-frequency resource group(s).

In one embodiment, the first field comprised by the first signaling indicates an index of the first time-frequency resource group in the first time-frequency resource group set of the present disclosure, the first time-frequency resource group set comprises a positive integer number of time-frequency resource group(s).

In one embodiment, the first field comprised by the first signaling is a PUCCH resource indicator, the specific meaning of the PUCCH resource indicator can be found in 3GPP TS38.213, chapter 9.2.3.

Embodiment 13

Figure 13:
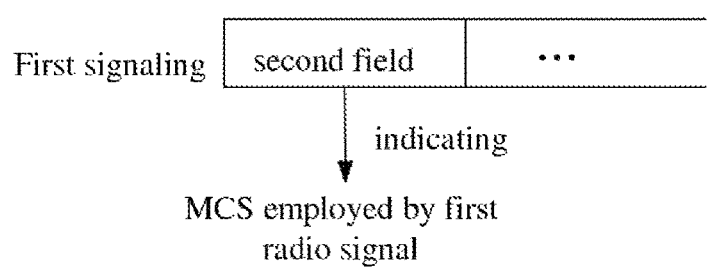
FIG. 13 illustrates a schematic diagram of a first signaling according to another embodiment of the present disclosure.

Embodiment 13 illustrates another schematic diagram of a first signaling, as shown in FIG. 13.

In Embodiment 13, the first signaling comprises a second field, the second field comprised by the first signaling is used for indicating an MCS employed by the first radio signal of the present disclosure out of a given MCS set. The given MCS set corresponds to the first MCS set or the second MCS set of the present disclosure.

In one embodiment, the given MCS set comprises a positive integer number of MCS(s).

In one embodiment, the second field comprised by the first signaling comprises a positive integer number of bit(s).

In one embodiment, the second field comprised by the first signaling explicitly indicates an MCS employed by the first radio signal out of the given MCS set.

In one embodiment, the second field comprised by the first signaling implicitly indicates an MCS employed by the first radio signal out of the given MCS set.

In one embodiment, the second field comprised by the first signaling indicates an index of an MCS employed by the first radio signal in the given MCS set.

In one embodiment, the second field comprised by the first signaling is a Modulation and coding scheme, the specific meaning of the Modulation and coding scheme can be found in 3GPP TS38.214, chapter 5.1.3.

Embodiment 14

Figure 14:
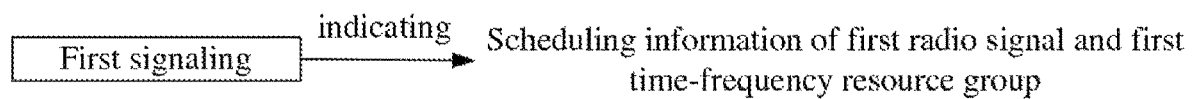
FIG. 14 illustrates a schematic diagram of a first signaling according to another embodiment of the present disclosure.

Embodiment 14 illustrates another schematic diagram of a first signaling, as shown in FIG. 14.

In Embodiment 14, the first signaling is used for indicating scheduling information of the first radio signal and the first time-frequency resource group of the present disclosure.

In one embodiment, the first signaling explicitly indicates scheduling information of the first radio signal.

In one embodiment, the first signaling implicitly indicates scheduling information of the first radio signal.

In one embodiment, the first signaling explicitly indicates the first time-frequency resource group.

In one embodiment, the first signaling implicitly indicates the first time-frequency resource group.

In one embodiment, the scheduling information of the first radio signal comprises at least one of occupied time domain resources, occupied frequency domain resources, an MCS, configuration information of DMRS, a HARQ process number, a Redundancy Version (RV), a New Data Indicator (NDI), a transmitting antenna port, corresponding multi-antenna relevant transmission, or corresponding multi-antenna reception.

In one subembodiment, the MCS comprised in the scheduling information of the first radio signal is the MCS employed by the first radio signal.

In one subembodiment, the configuration information of the DMRS comprised in the scheduling information of the first radio signal comprises an RS sequence, a mapping mode, DMRS type, occupied time domain resources, occupied frequency domain resources, occupied code domain resources, CP, or an OCC.

In one embodiment, the multi-antenna relevant reception refers to Spatial Rx parameters.

In one embodiment, the multi-antenna relevant reception refers to a receiving beam.

In one embodiment, the multi-antenna relevant reception refers to a receiving beamforming matrix.

In one embodiment, the multi-antenna relevant reception refers to a receiving analog beamforming matrix.

In one embodiment, the multi-antenna relevant reception refers to a receiving analog beamforming vector.

In one embodiment, the multi-antenna relevant reception refers to a receiving beamforming vector.

In one embodiment, the multi-antenna relevant reception refers to receiving spatial filtering.

In one embodiment, the multi-antenna relevant transmission refers to Spatial Tx parameters.

In one embodiment, the multi-antenna relevant transmission refers to a transmitting beam.

In one embodiment, the multi-antenna relevant transmission refers to a transmitting beamforming matrix.

In one embodiment, the multi-antenna relevant transmission refers to a transmitting analog beamforming matrix.

In one embodiment, the multi-antenna relevant transmission refers to a transmitting analog beamforming vector.

In one embodiment, the multi-antenna relevant transmission refers to a transmitting beamforming vector.

In one embodiment, the multi-antenna relevant transmission refers to transmitting spatial filtering.

In one embodiment, the Spatial Tx parameters include one or more of a transmitting antenna port, a transmitting antenna port set, a transmitting beam, a transmitting analog beamforming matrix, a transmitting analog beamforming vector, a transmitting beamforming matrix, a transmitting beamforming vector and transmitting spatial filtering.

In one embodiment, Spatial Rx parameters includes one or more of a receiving beam, a receiving analog beamforming matrix, a receiving analog beamforming vector, a receiving beamforming matrix, a receiving beamforming vector and receiving spatial filtering.

Embodiment 15

Figure 15:
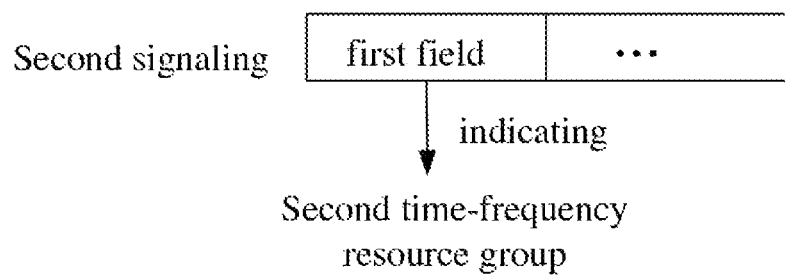
FIG. 15 illustrates a schematic diagram of a second signaling according to one embodiment of the present disclosure.

Embodiment 15 illustrates a schematic diagram of a second signaling, as shown in FIG. 15.

In Embodiment 15, the second signaling comprises a first field, the first field comprised by the second signaling is used for indicating the second time-frequency resource group of the present disclosure.

In one embodiment, the first field comprised by the second signaling comprises a positive integer number of bit(s).

In one embodiment, the first field comprised by the second signaling explicitly indicates the second time-frequency resource group.

In one embodiment, the first field comprised by the second signaling implicitly indicates the second time-frequency resource group.

In one embodiment, the first field comprised by the second signaling is used for indicating the second time-frequency resource group out of the second time-frequency resource group set of the present disclosure, the second time-frequency resource group set comprises a positive integer number of time-frequency resource group(s).

In one embodiment, the first field comprised by the second signaling indicates an index of the second time-frequency resource group in the second time-frequency resource group set of the present disclosure, the second time-frequency resource group set comprises a positive integer number of time-frequency resource group(s).

In one embodiment, the first field comprised by the second signaling is a PUCCH resource indicator, the specific meaning of the PUCCH resource indicator can be found in 3GPP T S38.213, chapter 9.2.3.

Embodiment 16

Figure 16:
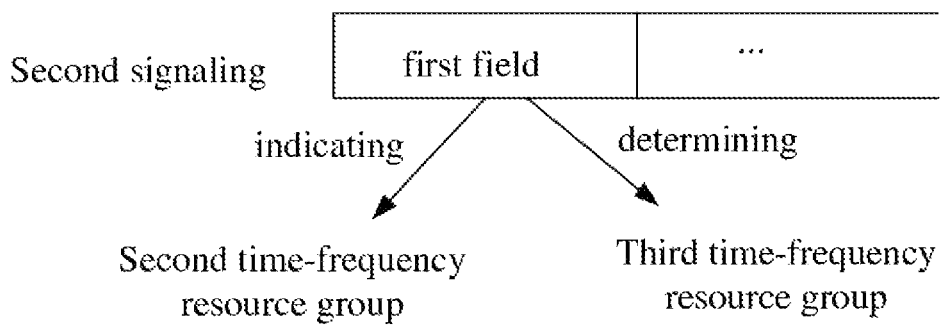
FIG. 16 illustrates a schematic diagram of a second signaling according to another embodiment of the present disclosure.

Embodiment 16 illustrates another schematic diagram of a second signaling, as shown in FIG. 16.

In Embodiment 16, the second signaling comprises a first field, the first field comprised by the second signaling is used for indicating the second time-frequency resource group of the present disclosure, and the first field comprised by the second signaling is also used for determining the third time-frequency resource group of the present disclosure.

In one embodiment, the second signaling is used for determining the third time-frequency resource group.

In one embodiment, the first field comprised by the second signaling comprises a positive integer number of bit(s).

In one embodiment, the first field comprised by the second signaling explicitly indicates the second time-frequency resource group.

In one embodiment, the first field comprised by the second signaling implicitly indicates the second time-frequency resource group.

In one embodiment, the first field comprised by the second signaling also explicitly indicates the third time-frequency resource group.

In one embodiment, the first field comprised by the second signaling also implicitly indicates the third time-frequency resource group.

In one embodiment, the second time-frequency resource group is used for determining the third time-frequency resource group.

In one embodiment, the third time-frequency resource group is a time-frequency resource group connected to the second time-frequency resource group, the connection between the third time-frequency resource group and the second time-frequency resource group is indicated by a higher layer signaling.

In one embodiment, an index of the second time-frequency resource group is used for determining the third time-frequency resource group.

In one embodiment, an index of the second time-frequency resource group is used for determining an index of the third time-frequency resource group.

In one embodiment, an index of the third time-frequency resource group is the same as an index of the second time-frequency resource group.

In one embodiment, the third time-frequency resource group is the same as the second time-frequency resource group.

In one embodiment, the first field comprised by the second signaling is used for indicating the second time-frequency resource group out of a second time-frequency resource group set, the second time-frequency resource group is used for determining the third time-frequency resource group out of a third time-frequency resource group set, the second time-frequency resource group set comprises a positive integer number of time-frequency resource group(s), the third time-frequency resource group set comprises a positive integer number of time-frequency resource group(s).

In one embodiment, the first field comprised by the second signaling is used for indicating the second time-frequency resource group out of a second time-frequency resource group set and indicating the third time-frequency resource group out of a third time-frequency resource group set, the second time-frequency resource group set comprises a positive integer number of time-frequency resource group(s), the third time-frequency resource group set comprises a positive integer number of time-frequency resource group(s).

In one embodiment, the first field comprised by the second signaling indicates an index of the second time-frequency resource group in a second time-frequency resource group set, the index of the second time-frequency resource group in the second time-frequency resource group set is used for determining the third time-frequency resource group out of a third time-frequency resource group set, the second time-frequency resource group set comprises a positive integer number of time-frequency resource group(s), the third time-frequency resource group set comprises a positive integer number of time-frequency resource group(s).

In one embodiment, the first field comprised by the second signaling indicates an index of the second time-frequency resource in a second time-frequency resource group set, an index of the third time-frequency resource group in a third time-frequency resource group set is the same as an index of the second time-frequency resource group in a second time-frequency resource group set, the second time-frequency resource group set comprises a positive integer number of time-frequency resource group(s), the third time-frequency resource group set comprises a positive integer number of time-frequency resource group(s).

In one embodiment, the first field comprised by the second signaling indicates an index of the second time-frequency resource group in a second time-frequency resource group set and an index of the third time-frequency resource group in a third time-frequency resource group set, the second time-frequency resource group set comprises a positive integer number of time-frequency resource group(s), the third time-frequency resource group set comprises a positive integer number of time-frequency resource group(s).

In one embodiment, the first field comprised by the second signaling is a PUCCH resource indicator, the specific meaning of the PUCCH resource indicator can be found in 3GPP T S38.213, chapter 9.2.3.

Embodiment 17

Figure 17:
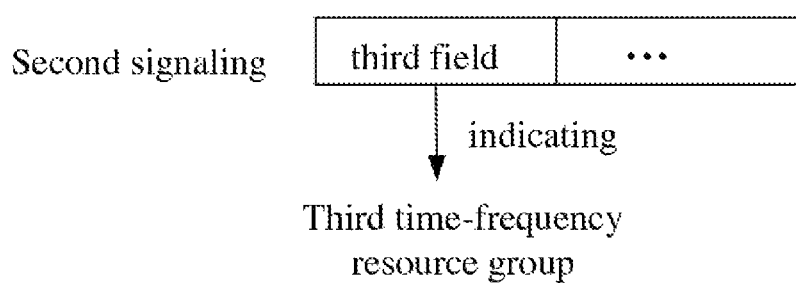
FIG. 17 illustrates a schematic diagram of a second signaling according to another embodiment of the present disclosure.

Embodiment 17 illustrates another schematic diagram of a second signaling, as shown in FIG. 17.

In Embodiment 17, the second signaling comprises a third field, the third field comprised by the second signaling is used for indicating the third time-frequency resource group of the present disclosure.

In one embodiment, the second signaling is used for indicating the third time-frequency resource group.

In one embodiment, the third field comprised by the second signaling comprises a positive integer number of bit(s).

In one embodiment, the third field comprised by the second signaling explicitly indicates the third time-frequency resource group.

In one embodiment, the third field comprised by the second signaling implicitly indicates the third time-frequency resource group.

In one embodiment, the third field comprised by the second signaling is used for indicating the third time-frequency resource group out of a third time-frequency resource group set, the third time-frequency resource group set comprises a positive integer number of time-frequency resource group(s).

In one embodiment, the third field comprised by the second signaling indicates an index of the third time-frequency resource group in a third time-frequency resource group set, the third time-frequency resource group set comprises a positive integer number of time-frequency resource group(s).

In one embodiment, the third field comprised by the second signaling is a PUCCH resource indicator, the specific meaning of the PUCCH resource indicator can be found in 3GPP T S38.213, chapter 9.2.3.

Embodiment 18

Figure 18:
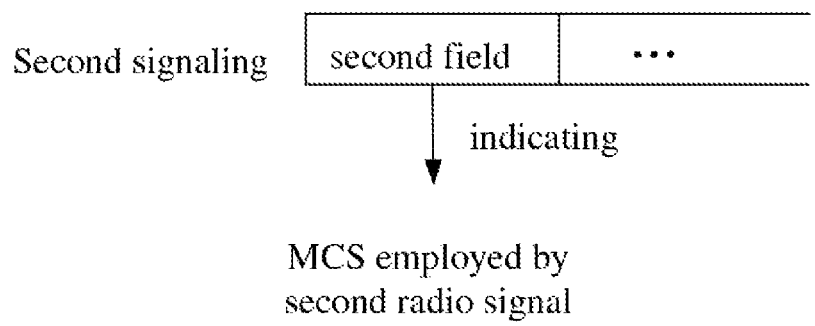
FIG. 18 illustrates a schematic diagram of a second signaling according to another embodiment of the present disclosure.

Embodiment 18 illustrates another schematic diagram of a second signaling, as shown in FIG. 18.

In Embodiment 18, the second signaling comprises a second field, the second field comprised by the second signaling is used for indicating an MCS employed by the second radio signal of the present disclosure out of a given MCS set. The given MCS set corresponds to the first MCS set or the second MCS in the present disclosure.

In one embodiment, the given MCS set comprises a positive integer number of MCS(s).

In one embodiment, the second field comprised by the second signaling comprises a positive integer number of bit(s).

In one embodiment, the second field comprised by the second signaling explicitly indicates an MCS employed by the second radio signal out of the given MCS set.

In one embodiment, the second field comprised by the second signaling implicitly indicates an MCS employed by the second radio signal out of the given MCS set.

In one embodiment, the second field comprised by the second signaling an index of an MCS employed by the second radio signal in the given MCS set.

In one embodiment, the second field comprised by the second signaling is a Modulation and coding scheme, the specific meaning of the Modulation and coding scheme can be found in 3GPP TS38.214, chapter 5.1.3.

Embodiment 19

Figure 19:
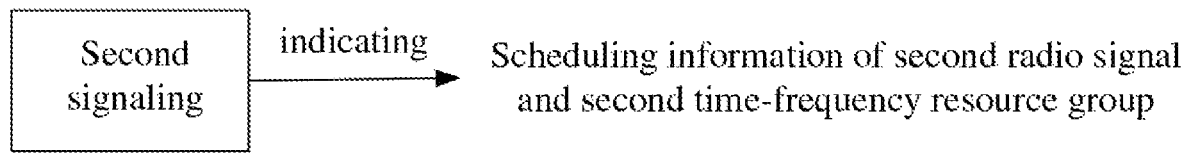
FIG. 19 illustrates a schematic diagram of a second signaling according to another embodiment of the present disclosure.

Embodiment 19 illustrates another schematic diagram of a second signaling, as shown in FIG. 19.

In Embodiment 19, the second signaling is used for indicating scheduling information of the second radio signal and the second time-frequency resource group of the present disclosure.

In one embodiment, the second signaling is used for indicating the third time-frequency resource group of the present disclosure.

In one embodiment, the second signaling explicitly indicates scheduling information of the second radio signal.

In one embodiment, the second signaling implicitly indicates scheduling information of the second radio signal.

In one embodiment, the second signaling explicitly indicates the second time-frequency resource group.

In one embodiment, the second signaling implicitly indicates the second time-frequency resource group.

In one embodiment, the scheduling information of the second radio signal comprises at least one of occupied time domain resources, occupied frequency domain resources, an MCS, configuration information of DMRS, a HARQ process number, an RV, an NDI, a transmitting antenna port, corresponding multi-antenna relevant transmission, or corresponding multi-antenna reception.

In one subembodiment, the MCS comprised in the scheduling information of the second radio signal is the MCS employed by the second radio signal.

In one subembodiment, the configuration information of the DMRS comprised in the scheduling information of the second radio signal comprises an RS sequence, a mapping mode, DMRS type, occupied time domain resources, occupied frequency domain resources, occupied code domain resources, CP, or an OCC.

Embodiment 20

Figure 20:
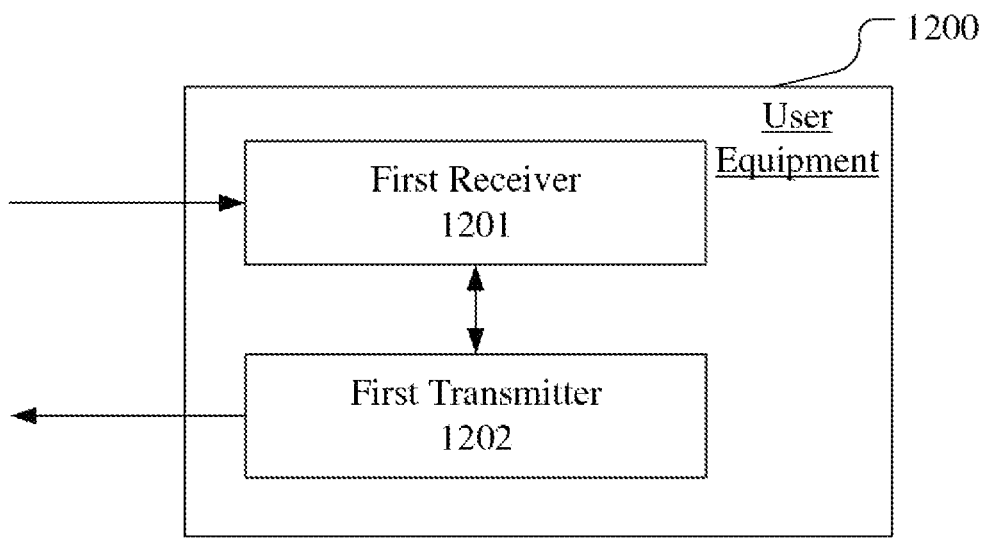
FIG. 20 illustrates a structure block diagram of a processing device in a UE according to one embodiment of the present disclosure.

Embodiment 20 illustrates a structure block diagram of a processing device in a UE, as shown in FIG. 20. In FIG. 20, a UE processing device 1200 comprises a first receiver 1201 and a first transmitter 1202.

In one embodiment, the first receiver 1201 comprises the receiver 456, the receiving processor 452 and the controller/processor 490 in Embodiment 4.

In one embodiment, the first receiver 1201 comprises at least the first two of the receiver 456, the receiving processor 452 and the controller/processor 490 in Embodiment 4.

In one embodiment, the first transmitter 1202 comprises the transmitter 456, the transmitting processor 455 and the controller/processor 490 in Embodiment 4.

In one embodiment, the first transmitter 1202 comprises at least the first two of the transmitter 456, the transmitting processor 455 and the controller/processor 490 in Embodiment 4.

The first receiver 1201 receives a first signaling, the first signaling being used for indicating a first time-frequency resource group, the first time-frequency resource group being reserved for a first bit block; and receives a second signaling, the second signaling being used for indicating a second time-frequency resource group, the second time-frequency resource group being reserved for a second bit block.

The second transmitter 1202 transmits the first bit block in the first time-frequency resource group and the second bit block in the second time-frequency resource group, or, transmits the first bit block and the second bit block in the third time-frequency resource group.

In Embodiment 20, the first time-frequency resource group, the second time-frequency resource group and the third time-frequency resource group are all time-frequency resource groups of G resource subsets, any of the G resource subsets comprises a positive integer number of time-frequency resource group(s), G is a positive integer greater than 1; when the first signaling and the second signaling both carry a first identifier, the first bit block and the second bit block are transmitted in the third time-frequency resource group; when at least one of the first signaling or the second signaling carries a second identifier, the second identifier being different from the first identifier, whether the first time-frequency resource group and the second time-frequency resource group belong to a same resource subset out of the G resource subsets is used for determining whether the first bit block and the second bit block are respectively transmitted in the first time-frequency resource group and the second time-frequency resource group or are both transmitted in the third time-frequency resource group.

In one embodiment, the first receiver 1201 also receives first information; receives a first radio signal; and receives a second radio signal. Herein, the first information is used for indicating the first identifier and the second identifier, the first bit block is used for indicating whether the first radio signal is correctly received, the second bit block is used for indicating whether the second radio signal is correctly received; when the first signaling carries the first identifier, the first signaling is used for indicating an MCS employed by the first radio signal out of a first MCS set; when the first signaling carries the second identifier, the first signaling is used for indicating an MCS employed by the first radio signal out of a second MCS set; when the second signaling carries the first identifier, the second signaling is used for indicating an MCS employed by the second radio signal out of the first MCS set; when the second signaling carries the second identifier, the second signaling is used for indicating an MCS employed by the second radio signal out of the second MCS set; a target BLER of the first MCS set is greater than a target BLER of the second MCS set;

In one embodiment, at least one of the first signaling or the second signaling carries the second identifier; when the first time-frequency resource group and the second time-frequency resource group belong to two different resource subsets out of the G resource subsets respectively, the first bit block is transmitted in the first time-frequency resource group and the second bit block is transmitted in the second time-frequency resource group; when both the first time-frequency resource group and the second time-frequency resource group belong to a same resource subset of the G resource subsets, the first bit block and the second bit block are transmitted in the third time-frequency resource group;

In one embodiment, the G resource subsets all belong to a first time window in time domain, the first time window comprises G1 time sub-windows, any two of the G1 time sub-windows are orthogonal, G1 is a positive integer greater than 1 and no greater than the G; any of the G resource subsets belongs to only one of the G1 time sub-windows in time domain, any of the G1 time sub-windows comprises time domain resources occupied by at least one of the G resource subsets; at least one of the first signaling or the second signaling carries the second identifier, whether the first time-frequency resource group and the second time-frequency resource group belong to a same time sub-window out of the G1 time sub-windows is used for determining whether the first bit block and the second bit block are respectively transmitted in the first time-frequency resource group and the second time-frequency resource group or are both transmitted in the third time-frequency resource group.

In one embodiment, when the first time-frequency resource group and the second time-frequency resource group respectively belong to two different time sub-windows out of the G1 time sub-windows in time domain, the first bit block is transmitted in the first time-frequency resource group and the second bit block is transmitted in the second time-frequency resource group; when both the first time-frequency resource group and the second time-frequency resource group belong to a same time sub-window out of the G1 time sub-windows in time domain, the first bit block and the second bit block are transmitted in the third time-frequency resource group.

In one embodiment, the first receiver 1201 also receives second information; wherein the second information is used for indicating the G resource subsets.

In one embodiment, the first receiver 1201 also receives third information; wherein the third information is used for indicating N time-frequency resource group sets, any of the N time-frequency resource group sets comprises a positive integer number of time-frequency resource group(s), any of the G resource subsets is composed of a positive integer number of time-frequency resource group(s) out of the N time-frequency resource groups sets, N is a positive integer; the first time-frequency resource group is a time-frequency resource group out of a first time-frequency resource group set, the second time-frequency resource group is a time-frequency resource group out of a second time-frequency resource group set, the third time-frequency resource group is a time-frequency resource group out of a third time-frequency resource group set; the first time-frequency resource group set, the second time-frequency resource group set and the third time-frequency resource group set are all time-frequency resource group sets of the N time-frequency resource group sets.

In one embodiment, the N is greater than 1; a number of bits comprised in the first bit block is used for determining the first time-frequency resource group set out of the N time-frequency resource group sets; a number of bits comprised in the second bit block is used for determining the second time-frequency resource group set out of the N time-frequency resource group sets, or, a sum of the number of bits comprised in the first bit block and the number of bits comprised in the second bit block is used for determining the second time-frequency resource group set out of the N time-frequency resource group sets.

In one embodiment, a sum of the number of bits comprised in the first bit block and the number of bits comprised in the second bit block is used for determining the third time-frequency resource group set out of the N time-frequency resource group sets.

Embodiment 21

Figure 21:
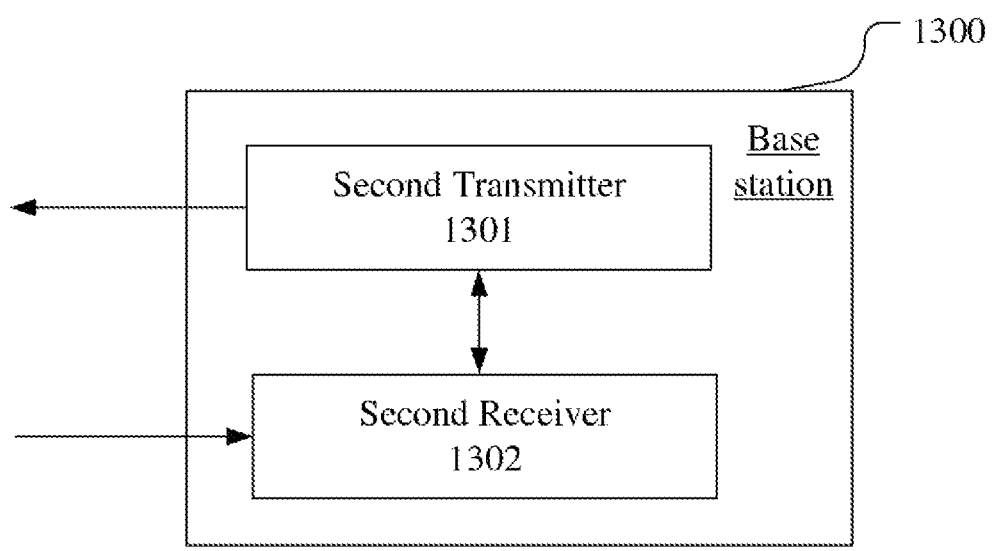
FIG. 21 illustrates a structure block diagram of a processing device in a base station according to one embodiment of the present disclosure.

Embodiment 21 illustrates a structure block diagram of a processing device in a base station, as shown in FIG. 21. In FIG. 21, a processing device 1300 in a base station comprises a second transmitter 1301 and a second receiver 1302.

In one embodiment, the second transmitter 1301 comprises the transmitter 416, the transmitting processor 415 and the controller/processor 440 in Embodiment 4.

In one embodiment, the second transmitter 1301 comprises at least the first two of the transmitter 416, the transmitting processor 415 and the controller/processor 440 in Embodiment 4.

In one embodiment, the second receiver 1302 comprises the receiver 416, the receiving processor 412 and the controller/processor 440 in Embodiment 4.

In one embodiment, the second receiver 1302 comprises at least the first two of the receiver 416, the receiving processor 412 and the controller/processor 440 in Embodiment 4.

The second transmitter 1301 transmits a first signaling, the first signaling being used for indicating a first time-frequency resource group, the first time-frequency resource group being reserved for a first bit block; and transmits a second signaling, the second signaling being used for indicating a second time-frequency resource group, the second time-frequency resource group being reserved for a second bit block.

The second receiver 1302 receives the first bit block in the first time-frequency resource group and receives the second bit block in the second time-frequency resource group, or, receives the first bit block and the second bit block in a third time-frequency resource group.

In Embodiment 21, the first time-frequency resource group, the second time-frequency resource group and the third time-frequency resource group are all time-frequency resource groups of G resource subsets, any of the G resource subsets comprises a positive integer number of time-frequency resource group(s), G is a positive integer greater than 1; when the first signaling and the second signaling both carry a first identifier, the first bit block and the second bit block are received in the third time-frequency resource group; when at least one of the first signaling or the second signaling carries a second identifier, the second identifier being different from the first identifier, whether the first time-frequency resource group and the second time-frequency resource group belong to a same resource subset out of the G resource subsets is used for determining whether the first bit block and the second bit block are respectively received in the first time-frequency resource group and the second time-frequency resource group or are both received in the third time-frequency resource group.

In one embodiment, the second transmitter 1301 also transmits first information; transmits a first radio signal; and transmits a second radio signal; herein, the first information is used for indicating the first identifier and the second identifier, the first bit block is used for indicating whether the first radio signal is correctly received, the second bit block is used for indicating whether the second radio signal is correctly received; when the first signaling carries the first identifier, the first signaling is used for indicating an MCS employed by the first radio signal out of a first MCS set; when the first signaling carries the second identifier, the first signaling is used for indicating an MCS employed by the first radio signal out of a second MCS set; when the second signaling carries the first identifier, the second signaling is used for indicating an MCS employed by the second radio signal out of the first MCS set; when the second signaling carries the second identifier, the second signaling is used for indicating an MCS employed by the second radio signal out of the second MCS set; a target BLER of the first MCS set is greater than a target BLER of the second MCS set.

In one embodiment, at least one of the first signaling or the second signaling carries the second identifier; when the first time-frequency resource group and the second time-frequency resource group belong to two different resource subsets out of the G resource subsets respectively, the first bit block is received in the first time-frequency resource group and the second bit block is received in the second time-frequency resource group; when both the first time-frequency resource group and the second time-frequency resource group belong to a same resource subset of the G resource subsets, the first bit block and the second bit block are received in the third time-frequency resource group.

In one embodiment, the G resource subsets all belong to a first time window in time domain, the first time window comprises G1 time sub-windows, any two of the G1 time sub-windows are orthogonal, G1 is a positive integer greater than 1 and no greater than the G; any of the G resource subsets belongs to only one of the G1 time sub-windows in time domain, any of the G1 time sub-windows comprises time domain resources occupied by at least one of the G resource subsets; at least one of the first signaling or the second signaling carries the second identifier, whether the first time-frequency resource group and the second time-frequency resource group belong to a same time sub-window out of the G1 time sub-windows is used for determining whether the first bit block and the second bit block are respectively received in the first time-frequency resource group and the second time-frequency resource group or are both received in the third time-frequency resource group.

In one embodiment, when the first time-frequency resource group and the second time-frequency resource group respectively belong to two different time sub-windows out of the G1 time sub-windows in time domain, the first bit block is received in the first time-frequency resource group and the second bit block is received in the second time-frequency resource group; when both the first time-frequency resource group and the second time-frequency resource group belong to a same time sub-window out of the G1 time sub-windows in time domain, the first bit block and the second bit block are received in the third time-frequency resource group.

In one embodiment, the second transmitter 1301 also transmits second information; herein, the second information is used for indicating the G resource subsets.

In one embodiment, the second transmitter 1301 also transmits third information; herein, the third information is used for indicating N time-frequency resource group sets, any of the N time-frequency resource group sets comprises a positive integer number of time-frequency resource group(s), any of the G resource subsets is composed of a positive integer number of time-frequency resource group(s) out of the N time-frequency resource groups sets, N is a positive integer; the first time-frequency resource group is a time-frequency resource group out of a first time-frequency resource group set, the second time-frequency resource group is a time-frequency resource group out of a second time-frequency resource group set, the third time-frequency resource group is a time-frequency resource group out of a third time-frequency resource group set; the first time-frequency resource group set, the second time-frequency resource group set and the third time-frequency resource group set are all time-frequency resource group sets of the N time-frequency resource group sets.

In one embodiment, the N is greater than 1; a number of bits comprised in the first bit block is used for determining the first time-frequency resource group set out of the N time-frequency resource group sets; a number of bits comprised in the second bit block is used for determining the second time-frequency resource group set out of the N time-frequency resource group sets, or, a sum of the number of bits comprised in the first bit block and the number of bits comprised in the second bit block is used for determining the second time-frequency resource group set out of the N time-frequency resource group sets.

In one embodiment, a sum of the number of bits comprised in the first bit block and the number of bits comprised in the second bit block is used for determining the third time-frequency resource group set out of the N time-frequency resource group sets.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, RFID terminals, NB-IOT terminals, Machine Type Communication (MTC) terminals, enhanced MTC (eMTC) terminals, data cards, low-cost mobile phones, low-cost tablet computers, etc. The base station or system device in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a User Equipment (UE) used for wireless communication, comprising:
receiving third information;
receiving a first signaling, the first signaling being used for indicating a first time-frequency resource group, the first time-frequency resource group being reserved for a first bit block;
receiving a second signaling, the second signaling being used for indicating a second time-frequency resource group, the second time-frequency resource group being reserved for a second bit block; and
transmitting the first bit block in the first time-frequency resource group and transmitting the second bit block in the second time-frequency resource group, or, transmitting the first bit block and the second bit block in a third time-frequency resource group;
wherein the first time-frequency resource group, the second time-frequency resource group and the third time-frequency resource group are all time-frequency resource groups of G resource subsets, any of the G resource subsets comprises a positive integer number of time-frequency resource group(s), G is a positive integer greater than 1; when the first signaling and the second signaling both carry a first identifier, the first bit block and the second bit block are transmitted in the third time-frequency resource group; when at least one of the first signaling or the second signaling carries a second identifier, the second identifier being different from the first identifier, whether the first time-frequency resource group and the second time-frequency resource group belong to a same resource subset out of the G resource subsets is used for determining whether the first bit block and the second bit block are respectively transmitted in the first time-frequency resource group and the second time-frequency resource group or are both transmitted in the third time-frequency resource group;
the third information is used for indicating N time-frequency resource group sets, any of the N time-frequency resource group sets comprises a positive integer number of time-frequency resource group(s), any of the G resource subsets is composed of a positive integer number of time-frequency resource group(s) out of the N time-frequency resource groups sets, N is a positive integer; the first time-frequency resource group is a time-frequency resource group out of a first time-frequency resource group set, the second time-frequency resource group is a time-frequency resource group out of a second time-frequency resource group set, the third time-frequency resource group is a time-frequency resource group out of a third time-frequency resource group set the first time-frequency resource group set, the second time-frequency resource group set and the third time-frequency resource group set are all time-frequency resource group sets of the N time-frequency resource group sets; the N is greater than 1; a number of bits comprised in the first bit block is used for determining the first time-frequency resource group set out of the N time-frequency resource group sets, a number of bits comprised in the second bit block is used for determining the second time-frequency resource group set out of the N time-frequency resource group sets, or a sum of the number of bits comprised in the first bit block and the number of bits comprised in the second bit block is used for determining the second time-frequency resource group set out of the N time-frequency resource group sets; a sum of the number of bits comprised in the first bit block and the number of bits comprised in the second bit block is used for determining the third time-frequency resource group set out of the N time-frequency resource group sets.

2. The method according to claim 1, comprising:
receiving first information;
receiving a first radio signal; and receiving a second radio signal; wherein the first information is used for indicating the first identifier and the second identifier, the first bit block is used for indicating whether the first radio signal is correctly received, the second bit block is used for indicating whether the second radio signal is correctly received; when the first signaling carries the first identifier, the first signaling is used for indicating a modulation and coding scheme (MCS) employed by the first radio signal out of a first MCS set; when the first signaling carries the second identifier, the first signaling is used for indicating an MCS employed by the first radio signal out of a second MCS set; when the second signaling carries the first identifier, the second signaling is used for indicating an MCS employed by the second radio signal out of the first MCS set; when the second signaling carries the second identifier, the second signaling is used for indicating an MCS employed by the second radio signal out of the second MCS set, a target BLER of the first MCS set is greater than a target BLER of the second MCS set;

or, receiving second information, wherein the second information is used for indicating the G resource subsets;

or, receiving third information, wherein the third information is used for indicating N time-frequency resource group sets, any of the N time-frequency resource group sets comprises a positive integer number of time-frequency resource group(s), any of the G resource subsets is composed of a positive integer number of time-frequency resource group(s) out of the N time-frequency resource groups sets, N is a positive integer, the first time-frequency resource group is a time-frequency resource group out of a first time-frequency resource group set, the second time-frequency resource group is a time-frequency resource group out of a second time-frequency resource group set, the third time-frequency resource group is a time-frequency resource group out of a third time-frequency resource group set, the first time-frequency resource group set, the second time-frequency resource group set and the third time-frequency resource group set are all time-frequency resource group sets of the N time-frequency resource group sets.

3. The method according to claim 1, wherein at least one of the first signaling or the second signaling carries the second identifier, when the first time-frequency resource group and the second time-frequency resource group belong to two different resource subsets out of the G resource subsets respectively, the first bit block is transmitted in the first time-frequency resource group and the second bit block is transmitted in the second time-frequency resource group; when both the first time-frequency resource group and the second time-frequency resource group belong to a same resource subset of the G resource subsets, the first bit block and the second bit block are transmitted in the third time-frequency resource group;

or, the G resource subsets all belong to a first time window in time domain, the first time window comprises G1 time sub-windows, any two of the G1 time sub-windows are orthogonal, G1 is a positive integer greater than 1 and no greater than the G, any of the G resource subsets belongs to only one of the G1 time sub-windows in time domain, any of the G1 time sub-windows comprises time domain resources occupied by at least one of the G resource subsets, at least one of the first signaling or the second signaling carries the second identifier, whether the first time-frequency resource group and the second time-frequency resource group belong to a same time sub-window out of the G1 time sub-windows is used for determining whether the first bit block and the second bit block are respectively transmitted in the first time-frequency resource group and the second time-frequency resource group or are both transmitted in the third time-frequency resource group.

4. A method in a base station used for wireless communication, comprising:

transmitting third information;

transmitting a first signaling, the first signaling being used for indicating a first time-frequency resource group, the first time-frequency resource group being reserved for a first bit block;

transmitting a second signaling, the second signaling being used for indicating a second time-frequency resource group, the second time-frequency resource group being reserved for a second bit block; and receiving the first bit block in the first time-frequency resource group and receiving the second bit block in the second time-frequency resource group, or, receiving the first bit block and the second bit block in a third time-frequency resource group;

wherein the first time-frequency resource group, the second time-frequency resource group and the third time-frequency resource group are all time-frequency resource groups of G resource subsets, any of the G resource subsets comprises a positive integer number of time-frequency resource group(s), G is a positive integer greater than 1; when the first signaling and the second signaling both carry a first identifier, the first bit block and the second bit block are received in the third time-frequency resource group; when at least one of the first signaling or the second signaling carries a second identifier, the second identifier being different from the first identifier, whether the first time-frequency resource group and the second time-frequency resource group belong to a same resource subset out of the G resource subsets is used for determining whether the first bit block and the second bit block are respectively received in the first time-frequency resource group and the second time-frequency resource group or are both received in the third time-frequency resource group;

the third information is used for indicating N time-frequency resource group sets, any of the N time-frequency resource group sets comprises a positive integer number of time-frequency resource group(s), any of the G resource subsets is composed of a positive integer number of time-frequency resource group(s) out of the N time-frequency resource groups sets, N is a positive integer; the first time-frequency resource group is a time-frequency resource group out of a first time-frequency resource group set, the second time-frequency resource group is a time-frequency resource group out of a second time-frequency resource group set, the third time-frequency resource group is a time-frequency resource group out of a third time-frequency resource group set the first time-frequency resource group set, the second time-frequency resource group set and the third time-frequency resource group set are all time-frequency resource group sets of the N time-frequency resource group sets; the N is greater than 1; a number of bits comprised in the first bit block is used for determining the first time-frequency resource group set out of the N time-frequency resource group sets; a number of bits comprised in the second bit block is used for determining the second time-frequency resource group set out of the N time-frequency resource group sets, or, a sum of the number of bits comprised in the first bit block and the number of bits comprised in the second bit block is used for determining the second time-frequency resource group set out of the N time-frequency resource group sets; a sum of the number of bits comprised in the first bit block and the number of bits comprised in the second bit block is used for determining the third time-frequency resource group set out of the N time-frequency resource group sets.

5. The method according to claim 4, comprising:
transmitting first information;
transmitting a first radio signal; and
transmitting a second radio signal;
wherein the first information is used for indicating the first identifier and the second identifier, the first bit block is used for indicating whether the first radio signal is correctly received, the second bit block is used for indicating whether the second radio signal is correctly received; when the first signaling carries the first identifier, the first signaling is used for indicating a modulation and coding scheme (MCS) employed by the first radio signal out of a first MCS set; when the first signaling carries the second identifier, the first signaling is used for indicating an MCS employed by the first radio signal out of a second MCS set; when the second signaling carries the first identifier, the second signaling is used for indicating an MCS employed by the second radio signal out of the first MCS set; when the second signaling carries the second identifier, the second signaling is used for indicating an MCS employed by the second radio signal out of the second MCS set; a target BLER of the first MCS set is greater than a target BLER of the second MCS set;
or, transmitting second information, wherein the second information is used for indicating the G resource subsets;
or, transmitting third information, wherein the third information is used for indicating N time-frequency resource group sets, any of the N time-frequency resource group sets comprises a positive integer number of time-frequency resource group(s), any of the G resource subsets is composed of a positive integer number of time-frequency resource group(s) out of the N time-frequency resource groups sets, N is a positive integer; the first time-frequency resource group is a time-frequency resource group out of a first time-frequency resource group set, the second time-frequency resource group is a time-frequency resource group out of a second time-frequency resource group set, the third time-frequency resource group is a time-frequency resource group out of a third time-frequency resource group set; the first time-frequency resource group set, the second time-frequency resource group set and the third time-frequency resource group set are all time-frequency resource group sets of the N time-frequency resource group sets.

6. The method according to claim 4, wherein at least one of the first signaling or the second signaling carries the second identifier; when the first time-frequency resource group and the second time-frequency resource group belong to two different resource subsets out of the G resource subsets respectively, the first bit block is received in the first time-frequency resource group and the second bit block is received in the second time-frequency resource group; when both the first time-frequency resource group and the second time-frequency resource group belong to a same resource subset of the G resource subsets, the first bit block and the second bit block are received in the third time-frequency resource group;
or, the G resource subsets all belong to a first time window in time domain, the first time window comprises G1 time sub-windows, any two of the G1 time sub-windows are orthogonal, G1 is a positive integer greater than 1 and no greater than the G; any of the G resource subsets belongs to only one of the G1 time sub-windows in time domain, any of the G1 time sub-windows comprises time domain resources occupied by at least one of the G resource subsets; at least one of the first signaling or the second signaling carries the second identifier, whether the first time-frequency resource group and the second time-frequency resource group belong to a same time sub-window out of the G1 time sub-windows is used for determining whether the first bit block and the second bit block are respectively received in the first time-frequency resource group and the second time-frequency resource group or are both received in the third time-frequency resource group.

7. A UE used for wireless communication, comprising:
a first receiver, receiving third information; receiving a first signaling, the first signaling being used for indicating a first time-frequency resource group, the first time-frequency resource group being reserved for a first bit block; and receiving a second signaling, the second signaling being used for indicating a second time-frequency resource group, the second time-frequency resource group being reserved for a second bit block; and
a first transmitter, transmitting the first bit block in the first time-frequency resource group and transmitting the second bit block in the second time-frequency resource group, or, transmitting the first bit block and the second bit block in a third time-frequency resource group;
wherein the first time-frequency resource group, the second time-frequency resource group and the third time-frequency resource group are all time-frequency resource groups of G resource subsets, any of the G resource subsets comprises a positive integer number of time-frequency resource group(s), G is a positive integer greater than 1; when the first signaling and the second signaling both carry a first identifier, the first bit block and the second bit block are transmitted in the third time-frequency resource group; when at least one of the first signaling or the second signaling carries a second identifier, the second identifier being different from the first identifier, whether the first time-frequency resource group and the second time-frequency resource group belong to a same resource subset out of the G resource subsets is used for determining whether the first bit block and the second bit block are respectively transmitted in the first time-frequency resource group and the second time-frequency resource group or are both transmitted in the third time-frequency resource group;
the third information is used for indicating N time-frequency resource group sets, any of the N time-frequency resource group sets comprises a positive integer number of time-frequency resource group(s), any of the G resource subsets is composed of a positive integer number of time-frequency resource group(s) out of the N time-frequency resource groups sets, N is a positive integer; the first time-frequency resource group is a time-frequency resource group out of a first time-frequency resource group set, the second time-frequency resource group is a time-frequency resource group out of a second time-frequency resource group set, the third time-frequency resource group is a time-frequency resource group out of a third time-frequency resource group set; the first time-frequency resource group set, the second time-frequency resource group set and the third time-frequency resource group set are all time-frequency resource group sets of the N time-frequency resource group sets; the N is greater than 1; a number of bits comprised in the first bit block is used for determining the first time-frequency resource group set out of the N time-frequency resource group sets, a number of bits comprised in the second bit block is used for determining the second time-frequency resource group set out of the N time-frequency resource group sets, or a sum of the number of bits comprised in the first bit block and the number of bits comprised in the second bit block is used for determining the second time-frequency resource group set out of the N time-frequency resource group sets; a sum of the number of bits comprised in the first bit block and the number of bits comprised in the second bit block is used for determining the third time-frequency resource group set out of the N time-frequency resource group sets.

8. The UE according to claim 7, wherein the first receiver also receives first information; receives a first radio signal; and receives a second radio signal; wherein the first information is used for indicating the first identifier and the second identifier, the first bit block is used for indicating whether the first radio signal is correctly received, the second bit block is used for indicating whether the second radio signal is correctly received; when the first signaling carries the first identifier, the first signaling is used for indicating a modulation and coding scheme (MCS) employed by the first radio signal out of a first MCS set; when the first signaling carries the second identifier, the first signaling is used for indicating an MCS employed by the first radio signal out of a second MCS set; when the second signaling carries the first identifier, the second signaling is used for indicating an MCS employed by the second radio signal out of the first MCS set; when the second signaling carries the second identifier, the second signaling is used for indicating an MCS employed by the second radio signal out of the second MCS set; a target BLER of the first MCS set is greater than a target BLER of the second MCS set.

9. The UE according to claim 7, wherein at least one of the first signaling or the second signaling carries the second identifier, when the first time-frequency resource group and the second time-frequency resource group belong to two different resource subsets out of the G resource subsets respectively, the first bit block is transmitted in the first time-frequency resource group and the second bit block is transmitted in the second time-frequency resource group; when both the first time-frequency resource group and the second time-frequency resource group belong to a same resource subset of the G resource subsets, the first bit block and the second bit block are transmitted in the third time-frequency resource group;

or, the G resource subsets all belong to a first time window in time domain, the first time window comprises G1 time sub-windows, any two of the G1 time sub-windows are orthogonal, G1 is a positive integer greater than 1 and no greater than the G, any of the G resource subsets belongs to only one of the G1 time sub-windows in time domain, any of the G1 time sub-windows comprises time domain resources occupied by at least one of the G resource subsets, at least one of the first signaling or the second signaling carries the second identifier, whether the first time-frequency resource group and the second time-frequency resource group belong to a same time sub-window out of the G1 time sub-windows is used for determining whether the first bit block and the second bit block are respectively transmitted in the first time-frequency resource group and the second time-frequency resource group or are both transmitted in the third time-frequency resource group.

10. The UE according to claim 7, wherein the G resource subsets all belong to a first time window in time domain, the first time window comprises G1 time sub-windows, any two of the G1 time sub-windows are orthogonal, G1 is a positive integer greater than 1 and no greater than the G, any of the G resource subsets belongs to only one of the G1 time sub-windows in time domain, any of the G1 time sub-windows comprises time domain resources occupied by at least one of the G resource subsets, at least one of the first signaling or the second signaling carries the second identifier, whether the first time-frequency resource group and the second time-frequency resource group belong to a same time sub-window out of the G1 time sub-windows is used for determining whether the first bit block and the second bit block are respectively transmitted in the first time-frequency resource group and the second time-frequency resource group or are both transmitted in the third time-frequency resource group;

when the first time-frequency resource group and the second time-frequency resource group respectively belong to two different time sub-windows out of the G1 time sub-windows in time domain, the first bit block is transmitted in the first time-frequency resource group and the second bit block is transmitted in the second time-frequency resource group; when both the first time-frequency resource group and the second time-frequency resource group belong to a same time sub-window out of the G1 time sub-windows in time domain, the first bit block and the second bit block are transmitted in the third time-frequency resource group.

11. The UE according to claim 7, wherein the first receiver also receives second information; wherein the second information is used for indicating the G resource subsets;

or, the first receiver also receives third information; wherein the third information is used for indicating N time-frequency resource group sets, any of the N time-frequency resource group sets comprises a positive integer number of time-frequency resource group(s), any of the G resource subsets is composed of a positive integer number of time-frequency resource group(s) out of the N time-frequency resource groups sets, N is a positive integer; the first time-frequency resource group is a time-frequency resource group out of a first time-frequency resource group set, the second time-frequency resource group is a time-frequency resource group out of a second time-frequency resource group set, the third time-frequency resource group is a time-frequency resource group out of a third time-frequency resource group set; the first time-frequency resource group set, the second time-frequency resource group set and the third time-frequency resource group set are all time-frequency resource group sets of the N time-frequency resource group sets.

12. A base station used for wireless communication, comprising:

a second transmitter, transmitting third information; transmitting a first signaling, the first signaling being used for indicating a first time-frequency resource group, the first time-frequency resource group being reserved for a first bit block; and transmitting a second signaling, the second signaling being used for indicating a second time-frequency resource group, the second time-frequency resource group being reserved for a second bit block;

a second receiver, receiving the first bit block in the first time-frequency resource group and receiving the second bit block in the second time-frequency resource group, or, receiving the first bit block and the second bit block in a third time-frequency resource group;

wherein the first time-frequency resource group, the second time-frequency resource group and the third time-frequency resource group are all time-frequency resource groups of G resource subsets, any of the G resource subsets comprises a positive integer number of time-frequency resource group(s), G is a positive integer greater than 1; when the first signaling and the second signaling both carry a first identifier, the first bit block and the second bit block are received in the third time-frequency resource group; when at least one of the first signaling or the second signaling carries a second identifier, the second identifier being different from the first identifier, whether the first time-frequency resource group and the second time-frequency resource group belong to a same resource subset out of the G resource subsets is used for determining whether the first bit block and the second bit block are respectively received in the first time-frequency resource group and the second time-frequency resource group or are both received in the third time-frequency resource group;

the third information is used for indicating N time-frequency resource group sets, any of the N time-frequency resource group sets comprises a positive integer number of time-frequency resource group(s), any of the G resource subsets is composed of a positive integer number of time-frequency resource group(s) out of the N time-frequency resource groups sets, N is a positive integer; the first time-frequency resource group is a time-frequency resource group out of a first time-frequency resource group set, the second time-frequency resource group is a time-frequency resource group out of a second time-frequency resource group set, the third time-frequency resource group is a time-frequency resource group out of a third time-frequency resource group set the first time-frequency resource group set, the second time-frequency resource group set and the third time-frequency resource group set are all time-frequency resource group sets of the N time-frequency resource group sets; the N is greater than 1; a number of bits comprised in the first bit block is used for determining the first time-frequency resource group set out of the N time-frequency resource group sets; a number of bits comprised in the second bit block is used for determining the second time-frequency resource group set out of the N time-frequency resource group sets, or, a sum of the number of bits comprised in the first bit block and the number of bits comprised in the second bit block is used for determining the second time-frequency resource group set out of the N time-frequency resource group sets; a sum of the number of bits comprised in the first bit block and the number of bits comprised in the second bit block is used for determining the third time-frequency resource group set out of the N time-frequency resource group sets.

13. The base station according to claim 12, wherein the second transmitter also transmits first information; transmits a first radio signal; and transmits a second radio signal; wherein the first information is used for indicating the first identifier and the second identifier, the first bit block is used for indicating whether the first radio signal is correctly received, the second bit block is used for indicating whether the second radio signal is correctly received; when the first signaling carries the first identifier, the first signaling is used for indicating a modulation and coding scheme (MCS) employed by the first radio signal out of a first MCS set; when the first signaling carries the second identifier, the first signaling is used for indicating an MCS employed by the first radio signal out of a second MCS set; when the second signaling carries the first identifier, the second signaling is used for indicating an MCS employed by the second radio signal out of the first MCS set; when the second signaling carries the second identifier, the second signaling is used for indicating an MCS employed by the second radio signal out of the second MCS set; a target BLER of the first MCS set is greater than a target BLER of the second MCS set.

14. The base station according to claim 12, wherein at least one of the first signaling or the second signaling carries the second identifier; when the first time-frequency resource group and the second time-frequency resource group belong to two different resource subsets out of the G resource subsets respectively, the first bit block is received in the first time-frequency resource group and the second bit block is received in the second time-frequency resource group; when both the first time-frequency resource group and the second time-frequency resource group belong to a same resource subset of the G resource subsets, the first bit block and the second bit block are received in the third time-frequency resource group;

or, the G resource subsets all belong to a first time window in time domain, the first time window comprises G1 time sub-windows, any two of the G1 time sub-windows are orthogonal, G1 is a positive integer greater than 1 and no greater than the G; any of the G resource subsets belongs to only one of the G1 time sub-windows in time domain, any of the G1 time sub-windows comprises time domain resources occupied by at least one of the G resource subsets; at least one of the first signaling or the second signaling carries the second identifier, whether the first time-frequency resource group and the second time-frequency resource group belong to a same time sub-window out of the G1 time sub-windows is used for determining whether the first bit block and the second bit block are respectively received in the first time-frequency resource group and the second time-frequency resource group or are both received in the third time-frequency resource group.

15. The base station according to claim 12, wherein the G resource subsets all belong to a first time window in time domain, the first time window comprises G1 time sub-windows, any two of the G1 time sub-windows are orthogonal, G1 is a positive integer greater than 1 and no greater than the G; any of the G resource subsets belongs to only one of the G1 time sub-windows in time domain, any of the G1 time sub-windows comprises time domain resources occupied by at least one of the G resource subsets; at least one of the first signaling or the second signaling carries the second identifier, whether the first time-frequency resource group and the second time-frequency resource group belong to a same time sub-window out of the G1 time sub-windows is used for determining whether the first bit block and the second bit block are respectively received in the first time-frequency resource group and the second time-frequency resource group or are both received in the third time-frequency resource group; when the first time-frequency resource group and the second time-frequency resource group respectively belong to two different time sub-windows out of the G1 time sub-windows in time domain, the first bit block is received in the first time-frequency resource group and the second bit block is received in the second time-frequency resource group; when both the first time-frequency resource group and the second time-frequency resource group belong to a same time sub-window out of the G1 time sub-windows in time domain, the first bit block and the second bit block are received in the third time-frequency resource group.

16. The base station according to claim 12, wherein the second transmitter also transmits second information, wherein the second information is used for indicating the G resource subsets;
  or, the second transmitter also transmits third information, wherein the third information is used for indicating N time-frequency resource group sets, any of the N time-frequency resource group sets comprises a positive integer number of time-frequency resource group(s), any of the G resource subsets is composed of a positive integer number of time-frequency resource group(s) out of the N time-frequency resource groups sets, N is a positive integer; the first time-frequency resource group is a time-frequency resource group out of a first time-frequency resource group set, the second time-frequency resource group is a time-frequency resource group out of a second time-frequency resource group set, the third time-frequency resource group is a time-frequency resource group out of a third time-frequency resource group set; the first time-frequency resource group set, the second time-frequency resource group set and the third time-frequency resource group set are all time-frequency resource group sets of the N time-frequency resource group sets.

* * * * *